(12) United States Patent
Miller et al.

(10) Patent No.: US 8,330,086 B2
(45) Date of Patent: Dec. 11, 2012

(54) MAGNETIC HEATING BLANKET

(75) Inventors: Robert J. Miller, Fall City, WA (US); David F. Taylor, Kent, WA (US); Marc R. Matsen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 454 days.

(21) Appl. No.: 12/638,960

(22) Filed: Dec. 15, 2009

(65) Prior Publication Data
US 2011/0139769 A1 Jun. 16, 2011

(51) Int. Cl.
*H05B 6/64* (2006.01)

(52) U.S. Cl. ........ 219/759; 219/634; 219/638; 219/602; 156/272.4

(58) Field of Classification Search ............ 219/759, 219/710, 667, 634, 635, 636, 638, 602, 647, 219/645, 633, 618; 156/272.4
See application file for complete search history.

(56) References Cited

U.S. PATENT DOCUMENTS

| | | | |
|---|---|---|---|
| 5,442,156 A | 8/1995 | Westerman et al. | |
| 5,645,744 A * | 7/1997 | Matsen et al. | 219/634 |
| 5,728,309 A * | 3/1998 | Matsen et al. | 219/633 |
| 5,808,281 A | 9/1998 | Matsen et al. | |
| 5,833,795 A | 11/1998 | Smith et al. | |
| 6,084,206 A | 7/2000 | Williamson et al. | |
| 6,528,771 B1 | 3/2003 | Matsen et al. | |
| 6,884,976 B2 * | 4/2005 | Matsen et al. | 219/634 |
| 2004/0089655 A1 * | 5/2004 | Matsen et al. | 219/602 |
| 2004/0099660 A1 | 5/2004 | Matsen et al. | |
| 2005/0006380 A1 | 1/2005 | Kagan | |
| 2006/0027308 A1 | 2/2006 | MacKenzie | |
| 2008/0128078 A1 | 6/2008 | May et al. | |
| 2008/0308210 A1 | 12/2008 | Keller et al. | |
| 2011/0139769 A1 | 6/2011 | Miller | |

FOREIGN PATENT DOCUMENTS

WO 2008/021420 2/2008

OTHER PUBLICATIONS

Applied Heat, Inc., "Heat Blankets," online brochure, available at <http://www.appliedheat.com/blankets.htm>, last visited Oct. 8, 2009.
Brisk Heat, Inc. "BriskHeat SR Silicone Rubber Composite Curing Heating Blankets," online brochure, available at <http://www.briskheat.com/p-355-sr-silicone-rubber-composite-curing-heating-blankets.aspx>, last visited Dec. 14, 2009.
PCT/US2010/056536, International Search Report, dated Feb. 15, 2011.

\* cited by examiner

*Primary Examiner* — David Nhu

(57) ABSTRACT

A heating blanket comprises a conductor for receiving current and generating a magnetic field in response to the current. The heating blanket may include a susceptor sleeve formed of magnetic material having a Curie temperature. The susceptor sleeve may extend along the conductor and may be inductively heated in response to the magnetic field.

25 Claims, 17 Drawing Sheets

MAGNETIC HEATING BLANKET

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to heating blankets and, more particularly, to a heating blanket and method for heating a structure to a substantially uniform temperature across the structure.

BACKGROUND

The reworking of composite structures frequently requires the localized application of heat. For example, when installing a patch in a rework area of a composite structure, heat must typically be applied to the adhesive at the bondline between the patch and rework area in order to fully cure the adhesive. When applying heat to the patch, the temperature of the bondline must typically be maintained within a relatively narrow temperature range which must be held for an extended period of time until the adhesive is cured. Overheating or under heating the rework area or structure located adjacent to the rework area is generally undesirable during the rework process.

Conventional heating equipment for heating composite structures may include heating blankets comprised of electrically resistive heating elements. A heating blanket may be positioned to heat the patch installed in the rework area. The heating blanket may conductively heat the patch, rework area and/or bondline to the desired temperature. Unfortunately, conventional heating blankets may lack the ability to provide uniform heat at the bondline for several reasons. For example, variations in the construction of conventional heating blankets may result in differential heating across the rework area. In addition, conventional heating blankets may lack the ability to compensate for heat sinks located adjacent to the rework area. Such heat sinks may comprise various elements such as stiffeners, stringers, ribs, bulkheads and other structural members in thermal contact with the structure. Such heat sinks may have relatively large thermal capacities and may therefore draw heat away from certain portions of the rework area while remaining portions of the rework area are continuously heated by the heating blanket. As a result, portions of the rework area that are adjacent to the heat sink may not reach the required adhesive curing temperatures.

Attempts to overcome the non-uniform heating of the rework area due to heat sinks include the use of waxes or other liquefiable materials that are added to an interior of the resistive heating blankets in attempts to distribute heat more uniformly throughout the rework area. In this manner, the wax or liquefiable medium allows for more intimate thermal contact between the heating blanket and the rework area of the composite structure. Unfortunately, the addition of wax increases the overall thickness and stiffness of the heating blanket reducing the ability of the heating blanket to substantially conform to the shape of a rework area in a complexly-curved location of the composite structure. A further issue associated with the use of wax in conventional heating blankets is the risk of contamination of the rework area in the event that the enclosure containing the wax develops a leak.

Further attempts to provide uniform heat distribution using conventional resistive heating blankets include multi-zone blanket systems, feedback loop systems, positive temperature coefficient heating elements, and temperature stabilizing plugs. Unfortunately, the additions of such systems to conventional resistive heating blankets are generally ineffective in providing a substantially uniform temperature without substantial variation across the bondline of the rework area.

As can be seen, there exists a need in the art for a system and method for heating a structure such as a rework area of a composite structure in a manner which maintains a substantially uniform temperature across the rework area. More specifically, there exists a need in the art for a system and method for uniformly heating a composite structure and which accommodates heat drawn from the rework area by heat sinks and other thermal variations located adjacent to the rework area. Furthermore, there exists a need in the art for a system and method for uniformly heating a composite structure in a manner which prevents overheating or under heating of the composite structure. Ideally, such system and method for uniformly heating the composite structure is low in cost and simple in construction.

SUMMARY

The above-noted needs associated with uniformly heating a structure are specifically addressed by the present disclosure which provides a heating blanket which may include a conductor for receiving current and generating a magnetic field in response thereto. The heating blanket may include magnetic material located adjacent to the conductor and wherein the magnetic material may generate heat in response to the magnetic field. In an embodiment, the heating blanket may include a susceptor sleeve formed of magnetic material having a Curie temperature. The susceptor sleeve may extend along the conductor for induction heating thereof in response to the magnetic field.

In a further embodiment, disclosed is a heating blanket for heating a rework area of a composite structure. The heating blanket may comprise a power supply for generating alternating current having a frequency of between approximately 1 kHz and 300 kHz and an amperage of between approximately 10 amps and 1000 amps at a voltage of between approximately 10 volts and 300 volts. The heating blanket may comprise a housing formed of flexible material and containing a thermally conductive matrix. An insulating layer may be disposed on one of opposing sides of the housing. The heating blanket may comprise a conductor housed within the housing and extending in a meandering pattern through the matrix. The conductor may receive alternating current from the power supply for generating an alternating magnetic field in response to the alternating current. The heating blanket may comprise a susceptor sleeve formed of magnetic material having a Curie temperature and being coaxially mounted to the conductor and electrically insulated therefrom for induction heating in response to the magnetic field.

The heating blanket may further be provided in an embodiment for heating a structure to a desired temperature. The heating blanket may comprise a conductor for receiving alternating current and generating a magnetic field in response thereto. A matrix may be disposed in proximity to the conductor and may contain at least one of ferromagnetic particles and superparamagnetic particles. The ferromagnetic particles may be hysteretically heated in response to the magnetic field. The ferromagnetic particles may be selected such that the Curie temperature is substantially greater than the desired temperature. The superparamagnetic particles may be heated by relaxation heating in response to the magnetic field. The superparamagnetic particles may have a Curie temperature corresponding to a size of the superparamagnetic particles.

The disclosed embodiments may further include a method of heating a structure comprising the steps of heating inductively the susceptor sleeve in response to the magnetic field. The method may also comprise heating conductively a structure in thermal contact with the susceptor sleeve. The inductive heating of the susceptor sleeve may be reduced when the susceptor sleeve becomes non-magnetic upon reaching the Curie temperature. The reduction in the heating of the susceptor sleeve may result in reducing the conductive heating of the structure.

Also disclosed is a method of heating a structure comprising the step of applying alternating current to a conductor having ferromagnetic particles embedded in a matrix located adjacent to the conductor. The ferromagnetic particles may have a Curie temperature and a hysteretic temperature that is less than the Curie temperature. The method may include generating a magnetic field in the ferromagnetic particles in response to the alternating current, heating the ferromagnetic particles, conductively heating the structure and reducing the heating of the ferromagnetic particles when the ferromagnetic particles reach the hysteretic temperature.

In a further embodiment, disclosed is a method of heating a structure comprising the steps of applying alternating current to a conductor having superparamagnetic particles embedded in a matrix located adjacent to the conductor. The superparamagnetic particles may have a Curie temperature corresponding to a size of the superparamagnetic particles. The method may comprise generating a magnetic field in response to the alternating current and heating the superparamagnetic particles by relaxation heating in response to the magnetic field. The structure may be heated conductively. The method may include reducing the relaxation heating of the superparamagnetic particles when the superparamagnetic particles attain the Curie temperature.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
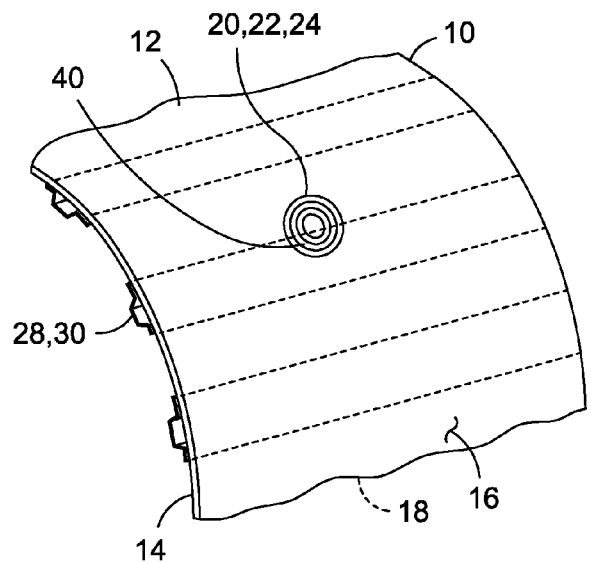
FIG. 1 is a perspective illustration of a composite structure having a rework area formed therein.

Referring now to the drawings wherein the showings are for purposes of illustrating preferred and various embodiments of the disclosure only and not for purposes of limiting the same, shown in FIG. 1 is a perspective illustration of a composite structure 10 upon which a rework process may be implemented using a heating blanket 54 illustrated in FIGS. 2-9. The heating blanket 54 illustrated in FIGS. 2-9 and as disclosed herein may be installed on a patch 40 which may be received within a rework area 20 as illustrated in FIG. 1. The heating blanket 54 of FIGS. 2-9 may apply heat to the rework area 20 in order to elevate the temperature of the rework area 20 to a uniform temperature throughout the rework area 20 in order to cure adhesive bonding the patch 40 to the rework area 20 and/or to cure the composite material forming the patch 40. In various embodiments, the heating blanket 54 as disclosed herein incorporates a combination of magnetic materials and high frequency alternating current in order to attain temperature uniformity to a structure 10 to which the heating blanket 54 is applied.

Advantageously, the temperature-dependent magnetic properties such as the Curie temperature of the magnetic materials used in the heating blanket 54 (FIGS. 2-9) may prevent overheating or under heating of areas to which the heating blanket 54 may be applied. In this manner, the heating blanket 54 facilitates the uniform application of heat to structures such as composite structures 10 (FIG. 1) during a manufacturing or rework process or any other process where uniform application of heat is required. In this regard, the heating blanket 54 compensates for heat sinks 28 (FIG. 1) that may draw heat away from portions of a structure 10 (FIG. 1) to which the heating blanket 54 is applied. More specifically, the heating blanket 54 continues to provide heat to portions of the structure 10 located near such heat sinks 28 while areas underneath the heating blanket 54 that have reached or attained the Curie temperature cease to provide heat to the rework area 20.

Figure 2:
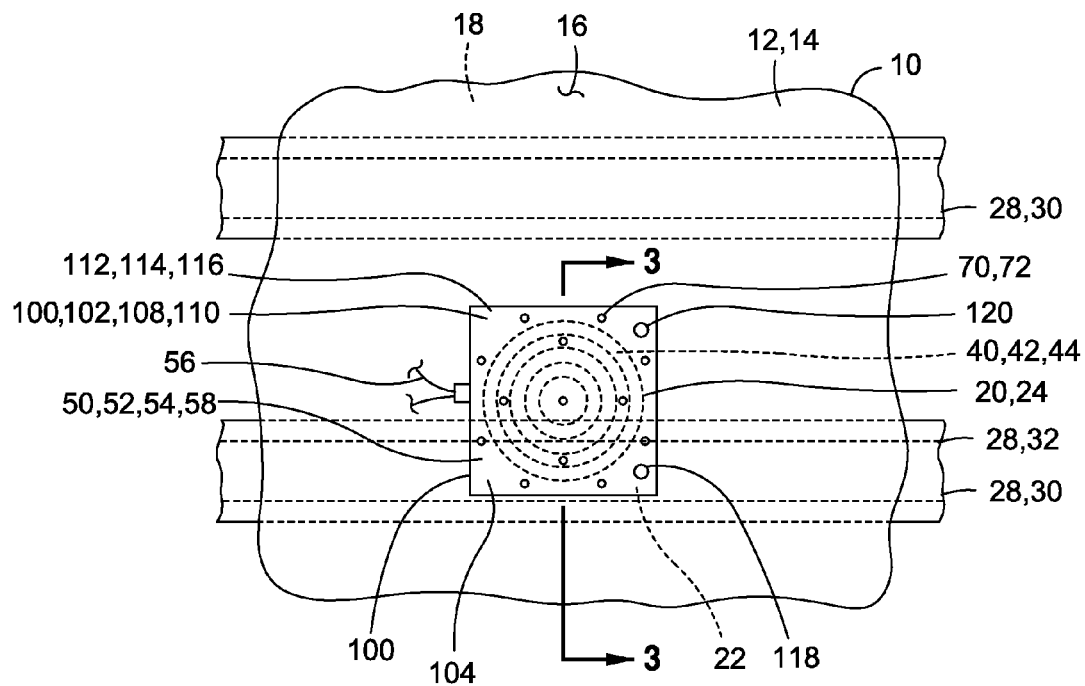
FIG. 2 is a plan view illustration of the rework area of FIG. 1 and illustrating a vacuum bag assembly and a heating blanket applied to the rework area and further illustrating a heat sink comprising a stringer extending along a portion of the rework area on a bottom surface of the composite structure.

For example, FIG. 1 illustrates a composite structure 10 which may include a skin 12 formed of plies 14 of composite material and wherein the skin 12 may have upper and lower surfaces 16, 18. The composite structure 10 may include a rework area 20 in the skin 12 formed by the removal of composite material. As can be seen in FIG. 2, the rework area 20 may be formed in the upper surface 16 and may extend at least partially through a thickness of the skin 12 although the rework area 20 may be formed in any configuration through the skin 12. Various structures may be mounted to the lower surface 18 opposite the rework area 20 such as stringers 30 which may act as heat sinks 28 drawing heat away from certain portions of the rework area 20 while the remaining portions continually receive heat from the heating blanket 54 (FIG. 2). Advantageously, the heating blanket 54 (FIG. 2) facilitates the uniform application of heat to the structure 10 by reducing heat input to portions of the rework area 20 that reach approximately the Curie temperature of the magnetic materials in the heating blanket 54 while maintaining a relatively higher level of heat input to portions of the rework area 20 that are below the Curie temperature as will be described in greater detail below.

Figure 3:
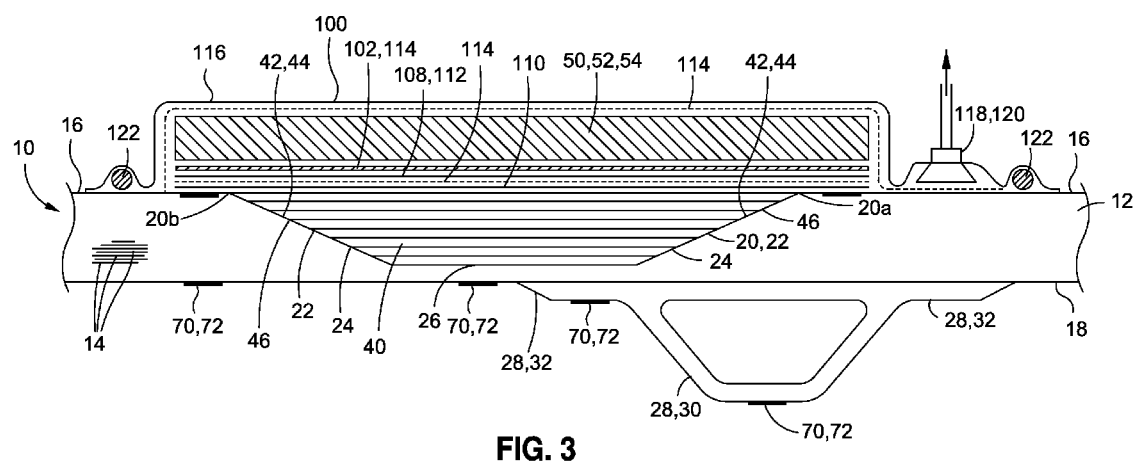
FIG. 3 is a cross-sectional illustration of the composite structure taken along line 3-3 of FIG. 2 and illustrating the stringer (i.e., heat sink) which may draw heat from localized portions of the rework area.

Referring to FIGS. 2-3, shown is a stringer 30 which may act as a heat sink 28 and which may be mounted to the lower surface 18 of the structure 10. The stringer 30 may include flanges 32 which may extend along a portion of the rework area 20 and which may partially overlap the portions of the rework area 20. For example, in FIG. 3, it can be seen that a portion of the stringer 30 and flange 32 overlap a right-hand side 20a of the rework area 20. In this regard, the stringer 30 and flange 32 may draw heat from the right-hand side 20a of the rework area 20. The remaining left-hand side 20b of the rework area 20 may lack any such heat sink 28 which would otherwise draw heat away from the rework area 20.

Referring still to FIGS. 2-3, the heating blanket 54 is illustrated as being mounted to the composite structure 10 over the patch 40. A vacuum bag assembly 100 may be installed over the heating blanket 54. The vacuum bag assembly 100 may include a bagging film 116 covering the heating blanket 54 and which may be sealed to the upper surface 16 of the composite structure 10 by means of sealant 122. A vacuum probe 118 and vacuum gauge 120 may extend from the bagging film 116 to a vacuum generator (not shown) to provide a means for drawing a vacuum on the bagging film 116 for application of pressure and to draw out volatiles and other gasses that may be generated as a result of heating uncured composite material of the patch 40.

As can be seen in FIG. 3, the vacuum bag assembly 100 may include a caul plate 102 positioned above a porous or non-porous parting film 110, 108. The caul plate 102 may facilitate the application of uniform pressure to the patch 40. The porous or non-porous parting film 110, 108 may prevent contact between the caul plate 102 and the patch 40. The vacuum bag assembly 100 may include additional layers such as a bleeder layer 112 and/or a breather layer 114. The patch 40 may be received within the rework area 20 such that a scarf 44 formed on the patch edge 42 substantially matches a scarf 24 formed at the boundary 22 of the rework area 20. In this regard, the interface between the patch 40 and rework area 20 comprises the bondline 46 wherein adhesive is installed for permanently bonding the patch 40 to the rework area 20 and includes adhesive located at the bottom center 26 portion of the rework area 20. As shown in FIG. 2, thermal sensors 70 such as thermocouples 72 may be strategically located on upper and lower surfaces 16, 18 of the composite structure 10 such as adjacent to the rework area 20 in order to monitor the temperature of such areas during the application of heat using the heating blanket 54. In this regard, thermocouples 72 may be placed on heat sinks 28 such as the stringer 30 body and stringer flanges 32 illustrated in FIG. 3 in order to monitor the temperature of such heat sinks 28 relative to other areas of the composite structure 10.

Figure 4:
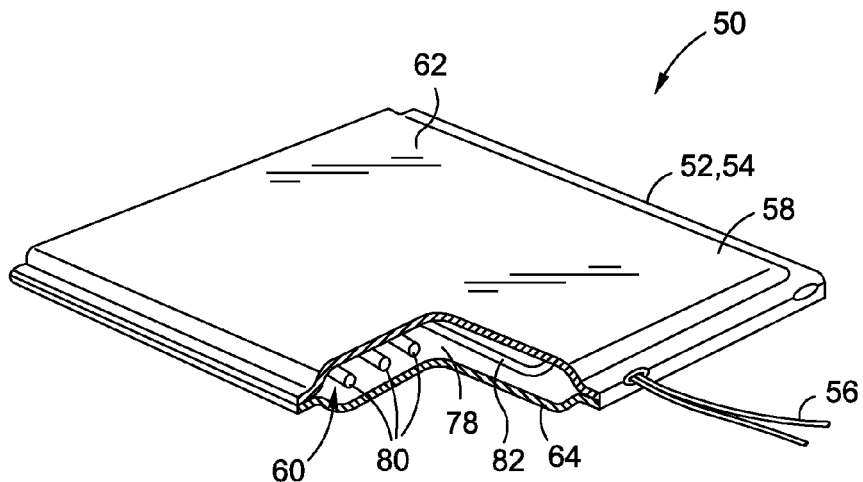
FIG. 4 is a perspective illustration of a heating blanket in an embodiment as may be used for heating the rework area of the composite structure.
Figure 6:
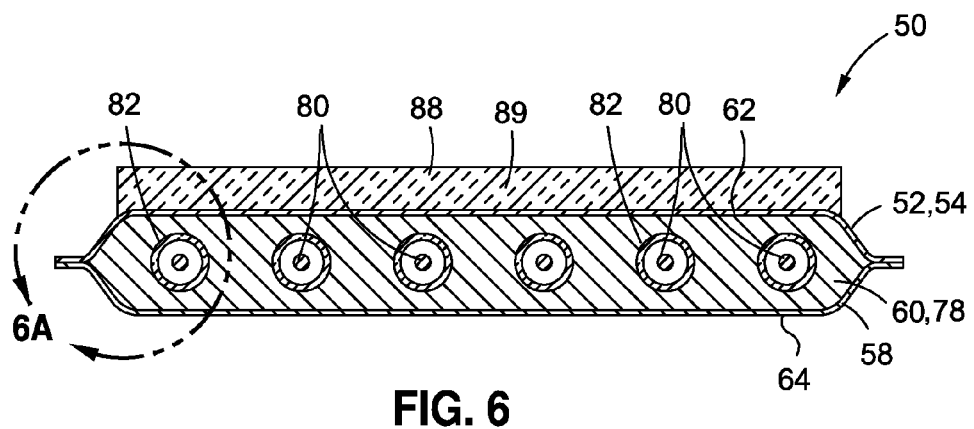
FIG. 6 is a cross-sectional illustration of the heating blanket taken along line 6-6 of FIG. 5 and illustrating the conductor having a susceptor sleeve coaxially mounted to the conductor for induction heating thereof in response to a magnetic field generated by an alternating current applied to the conductor.

Referring to FIG. 4, embodiments of the heating blanket 54 as disclosed herein may comprise three alternative techniques for employing the magnetic properties of the magnetic materials in combination with the application of high frequency alternating current (AC) electric power. FIGS. 6-6G illustrate an embodiment of the heating blanket 54 containing a susceptor sleeve 82 extending over a conductor 80 for inductive heating of the susceptor sleeve 82 in the presence of an alternating current. The inductively heated susceptor sleeve 82 thermally conducts heat to a matrix 78 best seen in FIG. 6F and which may surround the susceptor sleeve 82. The matrix 78 (FIG. 6F) may thermally conduct heat to a structure 10 to which the heating blanket 54 is mounted.

Figure 7:
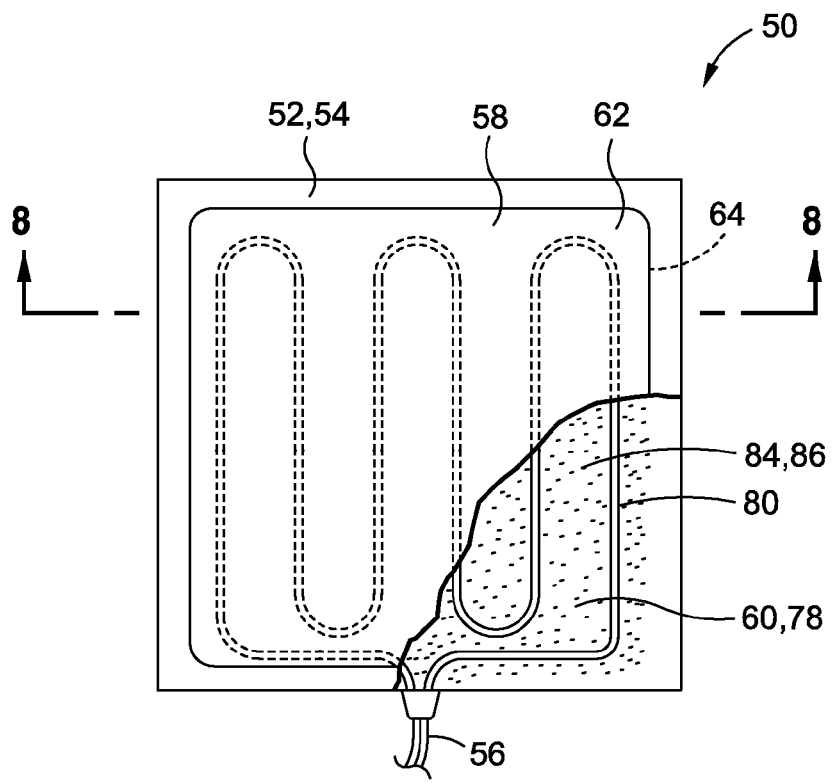
FIG. 7 is a top view illustration of an alternative embodiment of the heating blanket wherein the conductor extends through a thermally conductive matrix embedded with ferromagnetic particles.
Figure 8:
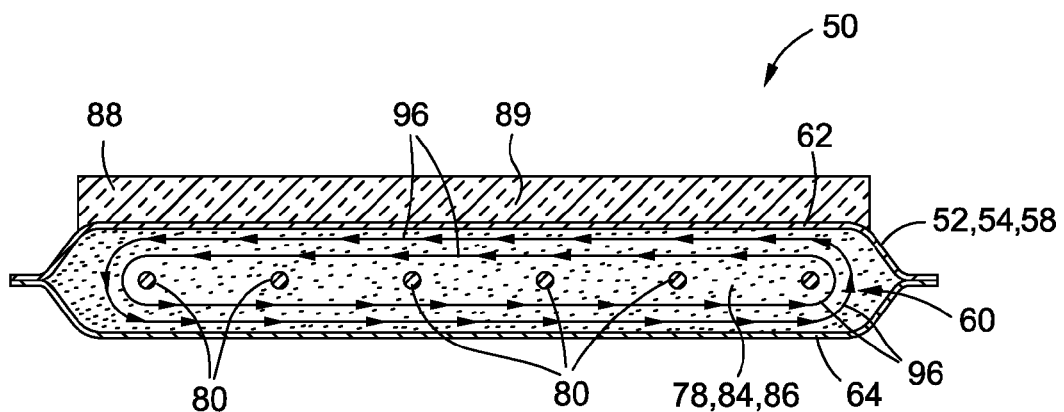
FIG. 8 is a sectional illustration of the heating blanket taken along line 8-8 of FIG. 7 and illustrating the magnetic field generated as a result of the conductor receiving alternating current.
Figure 8A:
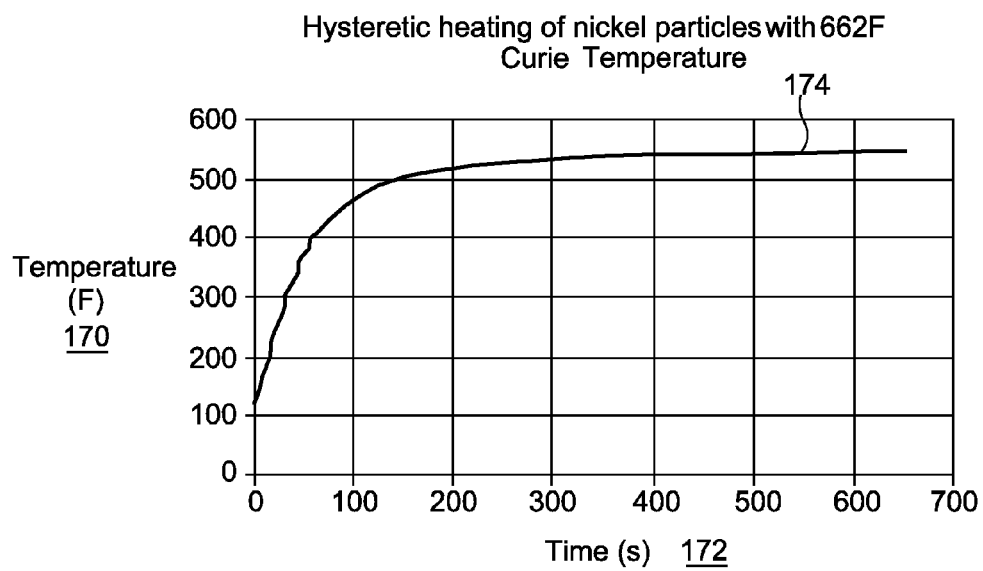
FIG. 8A is an illustration of a plot of temperature measured over a period of time during hysteretic heating of ferromagnetic particles contained within the heating blanket embodiment illustrated in FIG. 7.
Figure 8B:
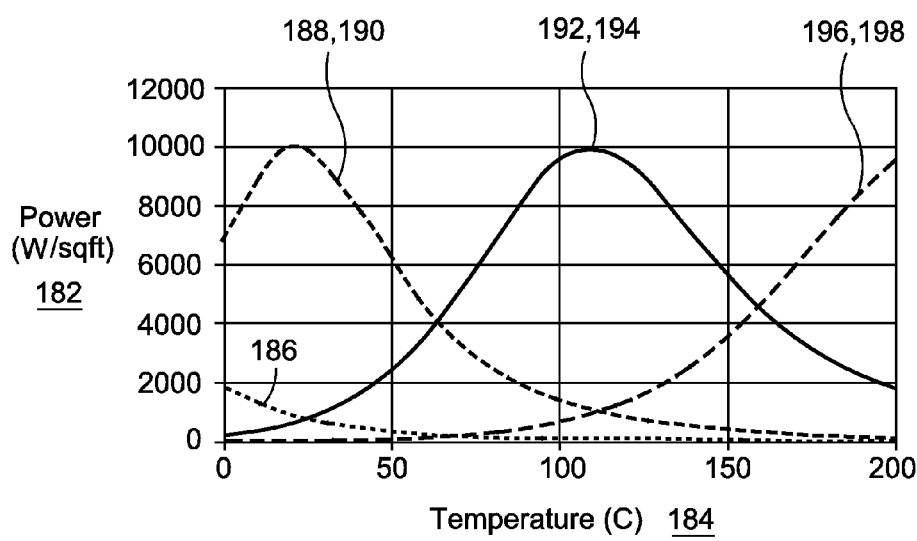
FIG. 8B is an illustration of a plot of power output relative to the temperature of superparamagnetic particles as may be contained within an embodiment of the heating blanket and wherein the superparamagnetic particles may have a corresponding plurality of Curie temperatures as a result of relaxation heating of the superparamagnetic particles in response to the magnetic field.
Figure 8C:
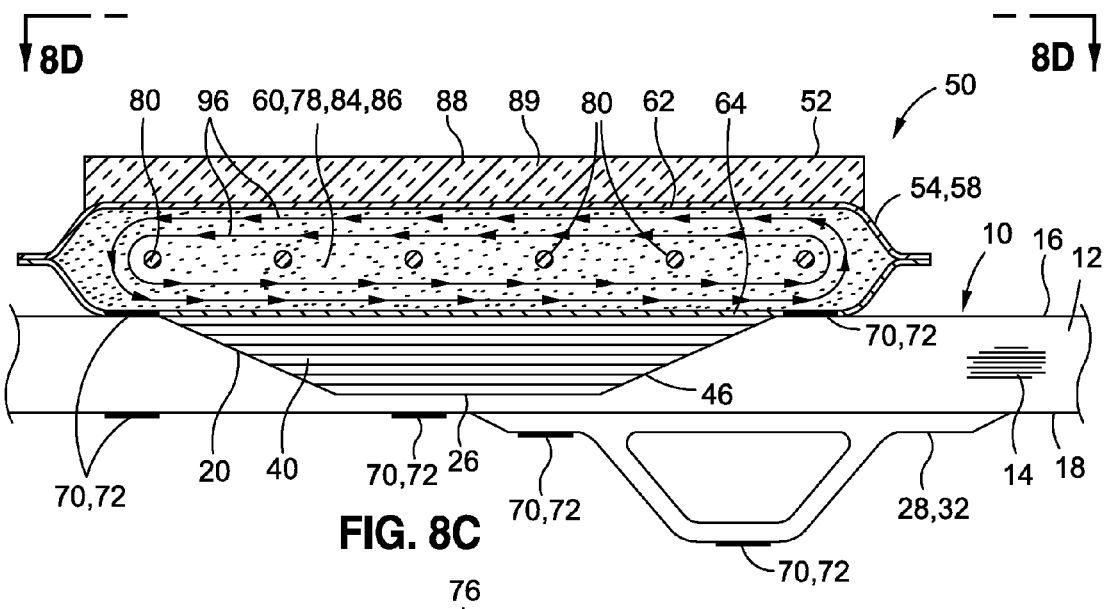
FIG. 8C is a cross-sectional illustration of the heating blanket having ferromagnetic particles or superparamagnetic particles contained therein and which may be heated by respective hysteretic and relaxation heating in response to a magnetic field.
Figure 8D:
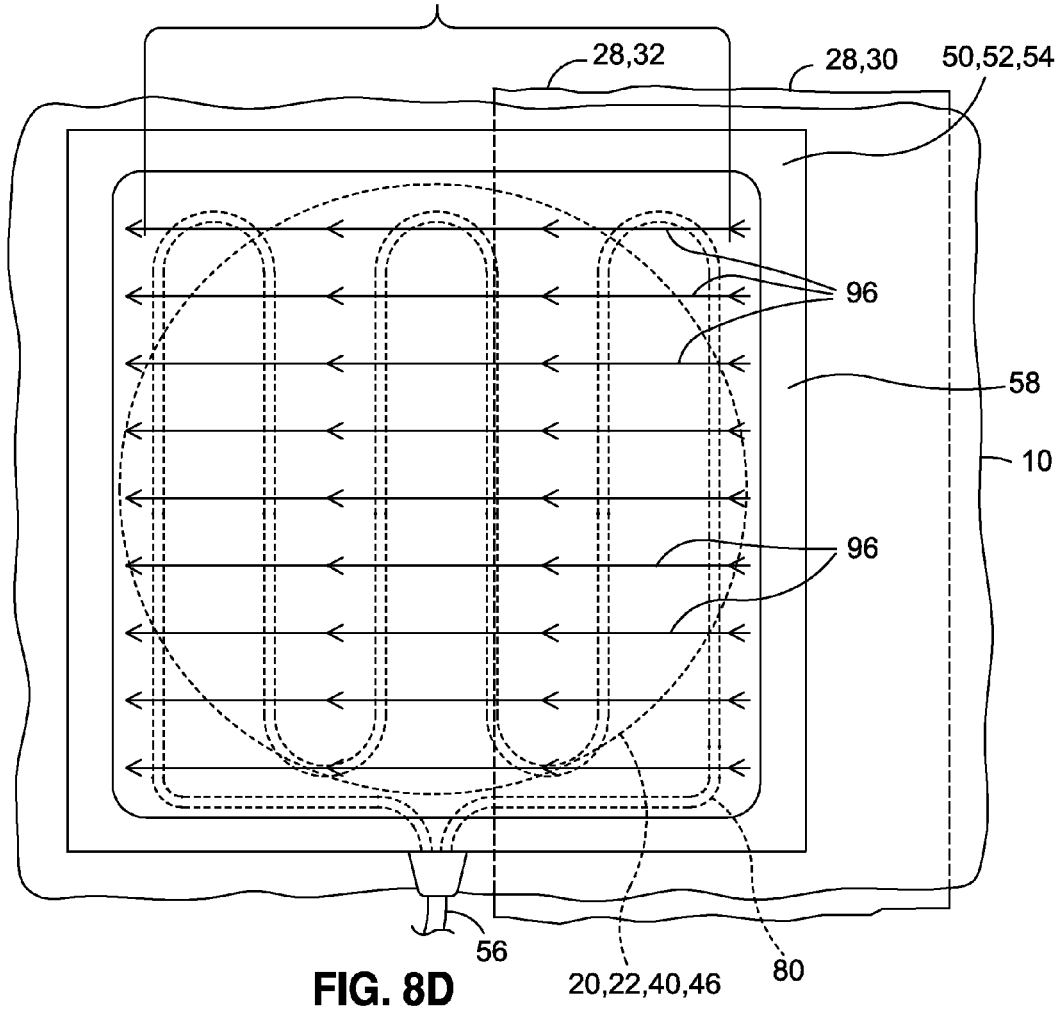
FIG. 8D is a top view illustration of the magnetic field generated by alternating current passing through the conductor as the temperatures of the particles approach the Curie temperature.
Figure 8E:
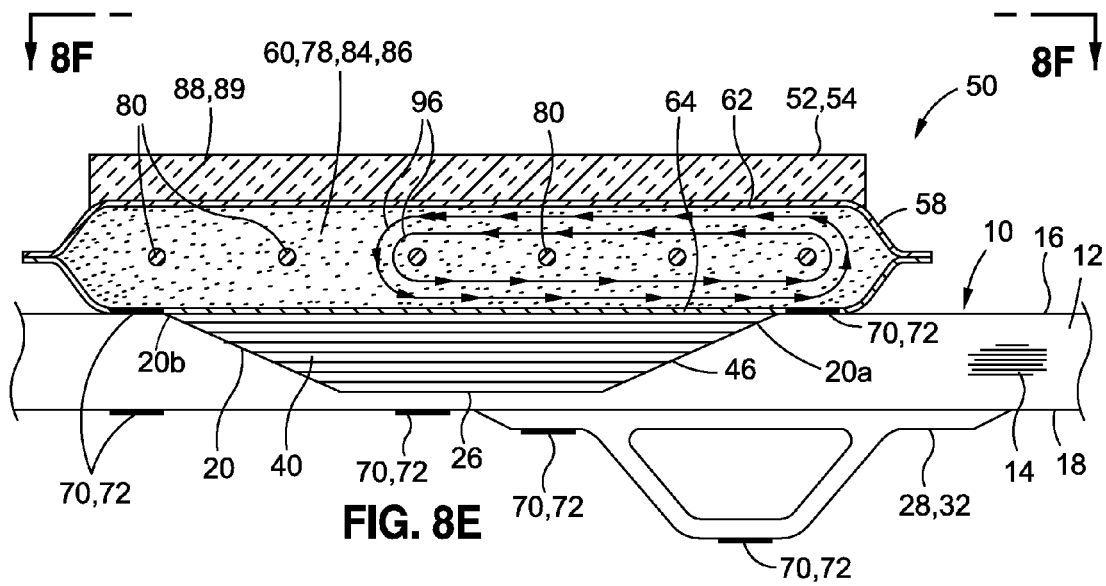
FIG. 8E is a cross-sectional illustration of the heating blanket similar to the heating blanket shown in FIG. 8C and illustrating the lack of magnetic fields on the left-hand side of the conductor and the continued generation of the magnetic field on the right-hand side of the conductor due to the continuing heating of the particles in response to heat being drawn from the rework area by the heat sink.
Figure 8F:
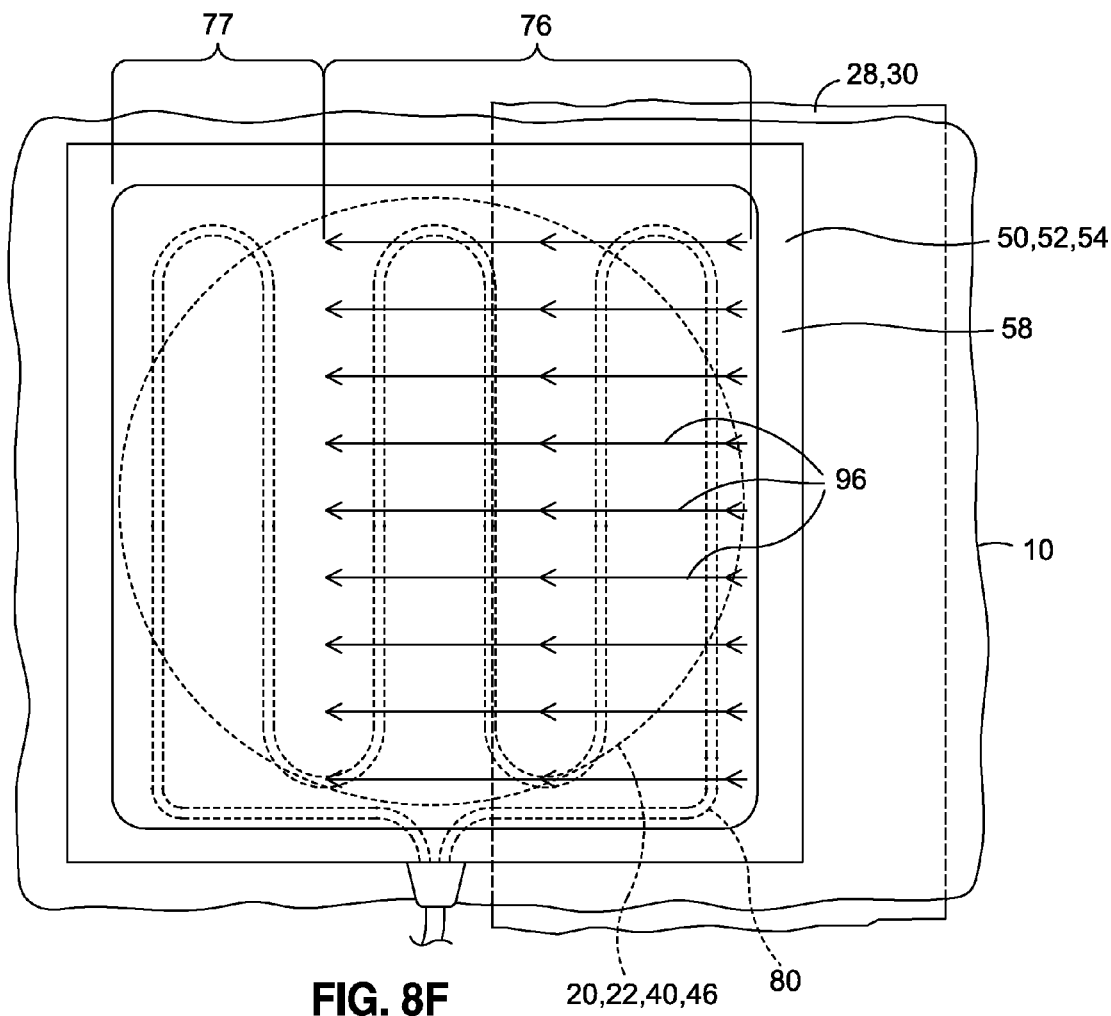
FIG. 8F is a top view illustration of the heating blanket and illustrating the lack of magnetic fields on the left-hand side of the conductor and the continued generation of the magnetic field on the right-hand side of the conductor due to the continuing heating of the particles in response to heat being drawn from the rework area by the heat sink.

FIGS. 7-8F illustrate embodiments of the heating blanket 54 containing a matrix 78 comprised of either ferromagnetic particles 84 or superparamagnetic particles 86. The embodiment containing ferromagnetic particles 84 may provide heat to a structure 10 by hysteretic heating of the ferromagnetic particles 84 to a temperature that is substantially below the Curie temperature of the ferromagnetic particles 84. The matrix 78 within which the ferromagnetic particles 84 are embedded may be heated by thermal conduction from the heat of the ferromagnetic particles 84. The embodiment containing superparamagnetic particles 86 may provide heat to a structure 10 by relaxation heating of the superparamagnetic particles 86 in correspondence to a Curie temperature range corresponding to a size or diameter of the superparamagnetic particles 86. The matrix 78 within which the superparamagnetic particles 86 are embedded may be heated by thermal conduction which is then conducted to the structure 10 to which the heating blanket is mounted.

In each of the configurations, the heating blanket 54 may include an electrical conductor 80 which may be arranged in a meandering formation or other suitable arrangement within an interior 60 of a housing 58 of the heating blanket 54. The conductor 80 may be arranged in any arrangement and is not limited to a meandering pattern. For example, the conductor 80 may be arranged in a circular coil formation or in any other arrangement that facilitates the desired spacing between adjacent portions of the conductor 80.

Referring still to FIG. 4, the heating blanket 54 may include a housing 58 defining an interior 60 and which may be formed of a suitable material which is preferably thermally conductive and which may also be flexible and/or resilient such that the heating blanket 54 may conform to curved areas to which it may be applied. In this regard, the housing 58 is preferably formed of a pliable and/or conformable material having a relatively high thermal conductivity and relatively low electrical conductivity. The housing 58 may comprise upper and lower face sheets 62, 64 formed of silicone, rubber, polyurethane or other suitable elastomeric or flexible material that provides dimensional stability to the housing 58 while maintaining flexibility for conforming the heating blanket 54 to curved surfaces. Although shown as having a generally hollow interior 60 bounded by the upper and lower face sheets 62, 64, the housing 58 may comprise an arrangement wherein the conductor 80 and the associated magnetic material are integrated or embedded within the housing 58 such that the conductor 80 is encapsulated within the housing 58 to form a unitary structure 10 that is preferably flexible for conforming to curved surfaces.

Figure 5:
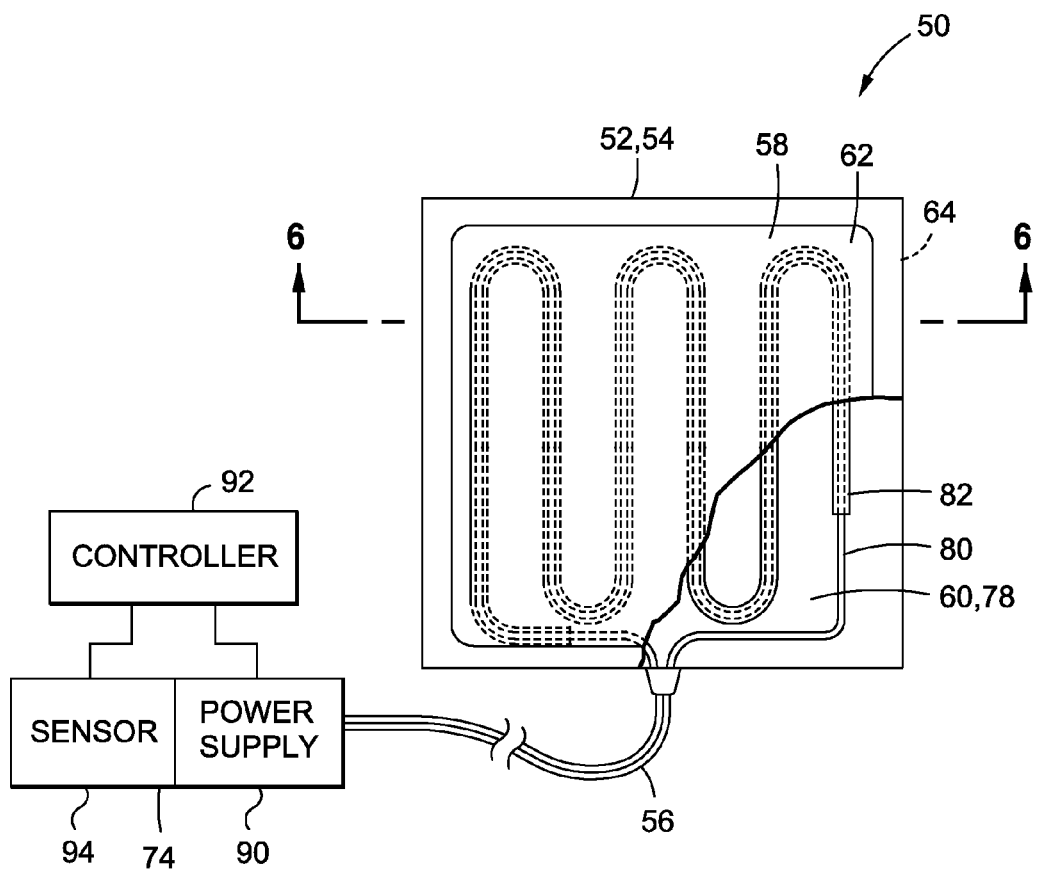
FIG. 5 is a schematic illustration of the heating blanket connected to a power supply, a controller and a sensor and illustrating a conductor housed within a housing of the heating blanket.

FIG. 5 illustrates a top view of the heating blanket 54 showing the meandering pattern of the conductor 80 within the housing 58. A power supply 90 providing alternating current electric power may be connected to the heating blanket 54 by means of the heating blanket wiring 56. The power supply 90 may be configured as a portable or fixed power supply 90 which may be connected to a conventional 60 Hz, 110 volt or 220 volt outlet. Although the power supply 90 may be connected to a conventional 60 Hz outlet, the frequency of the alternating current that is provided to the conductor 80 may preferably range from approximately 1000 Hz to approximately 300,000 Hz but is more preferably less than approximately 20,000 Hz in order to minimize unwanted inductive heating of materials such as graphite composite comprising the composite structure 10 (FIG. 3). The voltage provided to the conductor 80 may range from approximately 10 volts to approximately 300 volts but is preferably less than approximately 60 volts. Likewise, the frequency of the alternating current provided to the conductor 80 by the power supply is preferably between approximately 10 amps and approximately 1000 amps. In this regard, the power supply 90 may be provided in a constant-current configuration wherein the voltage across the conductor 80 may decrease as the magnetic materials within the heating blanket 54 approach the Curie temperature at which the voltage may cease to increase when the Curie temperature is reached as described in greater detail below.

Figure 6A:
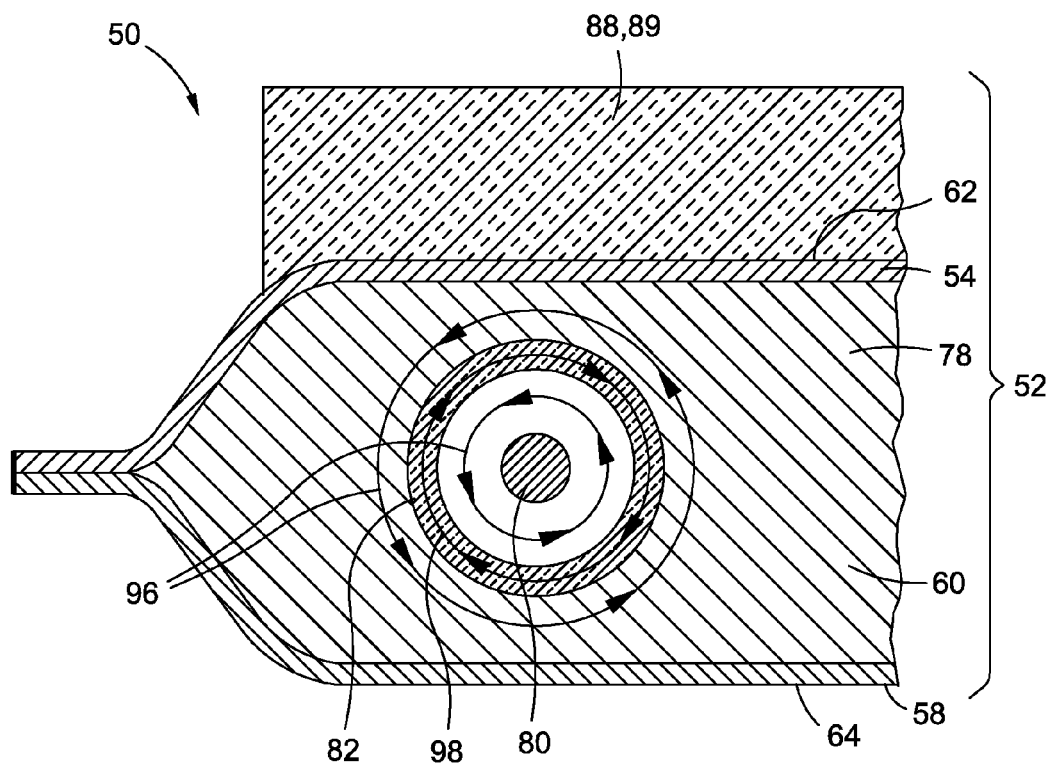
FIG. 6A is an enlarged sectional illustration of the conductor and susceptor sleeve surrounded by thermally conductive matrix and illustrating a magnetic field encircling the susceptor sleeve and generating an eddy current in the susceptor sleeve oriented in a direction opposite the direction of the magnetic field.

Referring to FIGS. 6-6A, shown is an embodiment of the magnetic blanket 54 having a susceptor sleeve 82 formed of magnetic material having a Curie temperature. The susceptor sleeve 82 may be formed as a solid or unitary component in a cylindrical arrangement or preferably from braided material in a sleeve configuration around the conductor 80 in order to enhance the flexibility of the heating blanket 54. As can be seen in FIG. 6A, the susceptor sleeve 82 may extend along a length of the conductor 80 within the housing 58. The susceptor sleeve 82 may be coaxially mounted relative to the conductor 80 and is preferably electrically insulated from the conductor 80. The application of alternating current to the conductor 80 produces an alternating magnetic field 96. The magnetic field 96 is absorbed by the magnetic material from which the susceptor sleeve 82 is formed causing the susceptor sleeve 82 to be inductively heated.

More particularly and referring to FIG. 6A, the flow of alternating current through the conductor 80 results in the generation of the magnetic field 96 surrounding the susceptor sleeve 82. Eddy currents 98 generated within the conductor 80 sleeve as a result of exposure thereof to the magnetic field 96 causes inductive heating of the susceptor sleeve 82. The housing 58 may include a thermally conductive matrix 78 material such as silicone to facilitate thermal conduction of the heat generated by the susceptor sleeve 82 to the surface of the heating blanket 54. The magnetic material from which the susceptor sleeve 82 is formed preferably has a high magnetic permeability and a Curie temperature that corresponds to the desired temperature to which the structure 10 (FIG. 6D) is to be heated by the heating blanket 54. The susceptor sleeve 82 and conductor 80 are preferably sized and configured such that at temperatures below the Curie temperature of the magnetic material, the magnetic field 96 is concentrated in the susceptor sleeve 82 due to the magnetic permeability of the material.

As a result of the close proximity of the susceptor sleeve 82 to the conductor 80, the concentration of the magnetic field 96 results in relatively large eddy currents 98 in the susceptor sleeve 82. The induced eddy currents 98 result in resistive heating of the susceptor sleeve 82. The susceptor sleeve 82 conductively heats the matrix 78 and the structure 10 (FIG. 6D) in thermal contact with the heating blanket 54. The heating of the susceptor sleeve 82 continues during application of the alternating current until the magnetic material approaches the Curie temperature. Upon reaching the Curie temperature, the susceptor sleeve 82 becomes non-magnetic at which point the magnetic fields 96 are no longer concentrated in the susceptor sleeve 82. The induced eddy currents 98 and associated resistive heating diminishes to a level sufficient to maintain the temperature of the susceptor sleeve 82 at the Curie temperature.

Figure 6B:
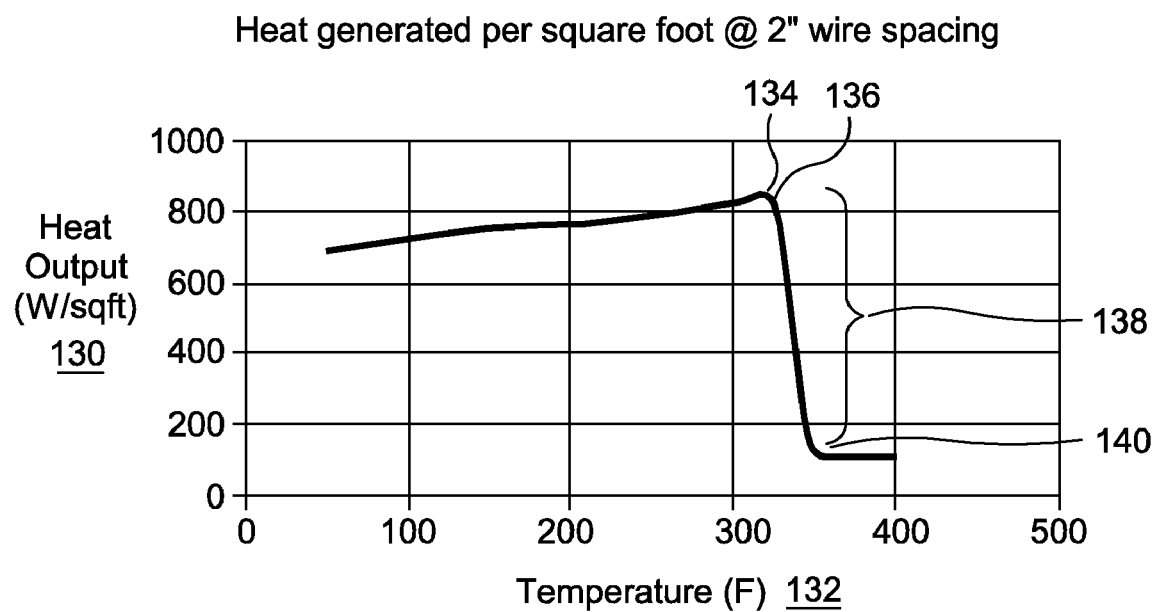
FIG. 6B is an illustration of a plot of heat output measured over temperature for an embodiment of the heating blanket containing the susceptor sleeve and illustrating a reduction in the inductive heat output of the susceptor sleeve upon becoming non-magnetic when reaching the Curie temperature.

As an example of the heating of the magnetic material to the Curie temperature 134, FIG. 6B illustrates a plot of heat output 130 measured over temperature 132 for a heating blanket 54 (FIG. 6) comprised of a susceptor sleeve 82 mounted on a conductor 80 wherein the conductor 80 is formed in a meandering pattern as illustrated in FIG. 6. As can be seen in FIG. 6B, heat output 130 of the heating blanket gradually increases from approximately 700 watts per square foot (W/sqft) to 850 W/sqft during a temperature increase of from 50° F. to approximately 320° F. at which point the Curie temperature 134 is reached at the magnetic 136 limit of the magnetic material from which the susceptor sleeve is formed. Heat output 130 of the heating blanket decreases from 800 W/sqft to approximately 100 W/sqft during a transient section 138 illustrated in FIG. 6B while the temperature maintains relatively constant at between approximately 320° F. and 350° F. The magnetic material of the susceptor sleeve becomes non-magnetic 140 at the temperature of 350° F. at which point the induced currents in the susceptor sleeve diminish to a level for maintaining the temperature of the susceptor sleeve at the Curie temperature 134.

FIG. 6B is an example of a magnetic material having a Curie temperature 134 of approximately 350° F. In this regard, it can be seen that the magnetic material may be selected to provide any temperature corresponding to the desired temperature of the structure 10 (FIG. 6D) to which the heating blanket 54 (FIG. 6D) is mounted. For example, for bonding a composite patch 42 (FIG. 6D) to a rework area 20 (FIG. 6D), the adhesive may require a curing temperature of from approximately 250° F. to 350° F. In this regard, the susceptor sleeve 82 (FIG. 6D) may be comprised of a suitable material having a Curie temperature of between 250° F. to 350° F. However, the susceptor sleeve 82 may be comprised of material having any suitable Curie temperature.

The magnetic material may be provided in a variety of compositions including, but not limited to, a metal, an alloy, a metal oxide, a ferrite or any other suitable material having a Curie temperature that approximates any desired temperature in the structure to be heated. For example, the susceptor sleeve 82 (FIG. 6D) may be formed of an alloy having a composition of 25 wt. % Cu-75 wt. % Ni which has a Curie temperature of approximately 250° F. The alloy may also be selected as having a composition of 18 wt. % Cu-82 wt. % Ni which has a Curie temperature of approximately 350° F. However, the susceptor sleeve 82 may be formed of a variety of other magnetic materials such as alloys which have Curie temperatures in the range of the particular application such as the range of the adhesive curing temperature or the curing temperature of the composite material from which the patch may be formed. Metals comprising the magnetic material may include iron, cobalt or nickel. Alloys from which the magnetic material may be formed may comprise a combination of the above-described metals including, but not limited to, iron, cobalt and nickel. Metal oxides may include, without limitation, magnetite, maghemite and a variety of other oxides and metals. Copper may also be used as an alloy for forming the susceptor sleeve.

Likewise, the conductor 80 (FIG. 6D) may be formed of any suitable material having low electrical resistance. Furthermore, the conductor 80 is preferably formed of flexible material to facilitate the application of the heating blanket to curved surfaces. In this regard, the conductor 80 may be formed of Litz wire or other similar wire configurations having a flexible nature and which are configured for carrying high frequency alternating current with minimal weight. The conductor 80 material preferably possesses a relatively low electrical resistance in order to minimize unwanted and/or uncontrollable resistive heating of the conductor 80. The conductor may be provided as a single strand of wire of unitary construction or the conductor 80 may be formed of braided material such as braided cable. In addition, the conductor 80 may comprise a plurality of conductors which may be electrically connected in parallel in order to minimize the magnitude of the voltage otherwise required for relative long lengths of the conductor such as may be required for large heating blanket configurations.

Referring to FIGS. 6 and 6A, the housing may be formed of a flexible material to provide thermal conduction of heat generated by the susceptor sleeve to the structure to which the heating blanket is applied. In order to minimize environmental heat losses from the heating blanket 54, an insulation layer 88 may be included as illustrated in FIGS. 6 and 6A. The insulation layer 88 may comprise insulation 89 formed of silicone or other suitable material to minimize heat loss by radiation to the environment. In addition, the insulation layer 88 may improve the safety and thermal efficiency of the heating blanket 54. As was indicated above, the housing 58 may be formed of any suitable high temperature material such as silicone or any other material having a suitable thermal conductivity and low electrical conductivity. Such material may include, but is not limited to, silicone, rubber and polyurethanes or any other thermally conductive material that is preferably flexible.

Referring to FIG. 5, the heating blanket 54 may include thermal sensors (not shown) such as thermocouples or other suitable temperature sensing devices for monitoring heat at locations along the area of the heating blanket 54 in contact with the structure 10 (FIG. 3). Alternatively, the heating blanket 54 may include a voltage sensor 94 or other sensing device connected to the power supply 90 as illustrated in FIG. 5. As was indicated above, the power supply 90 may be provided as a constant current configuration to minimize inductive heating of electrically conductive materials such as graphite-epoxy composites typically used in composite construction. Furthermore, a constant current configuration for the power supply 90 may minimize unwanted resistive heating in the conductor 80 wiring.

Referring still to FIG. 5, the sensor 94 may be configured to indicate the voltage level provided by the power supply 90.

For a constant current configuration of the heating blanket 54, the voltage may decrease as the magnetic material approaches the Curie temperature. The power supply 90 may also be configured to facilitate adjustment of the frequency of the alternating current in order to alter the heating rate of the magnetic material. In this regard, the power supply 90 may be coupled to a controller 92 to facilitate adjustment of the alternating current over a predetermined range in order to facilitate the application of the heating blanket 54 to a wide variety of structures having different heating requirements.

Figure 6C:
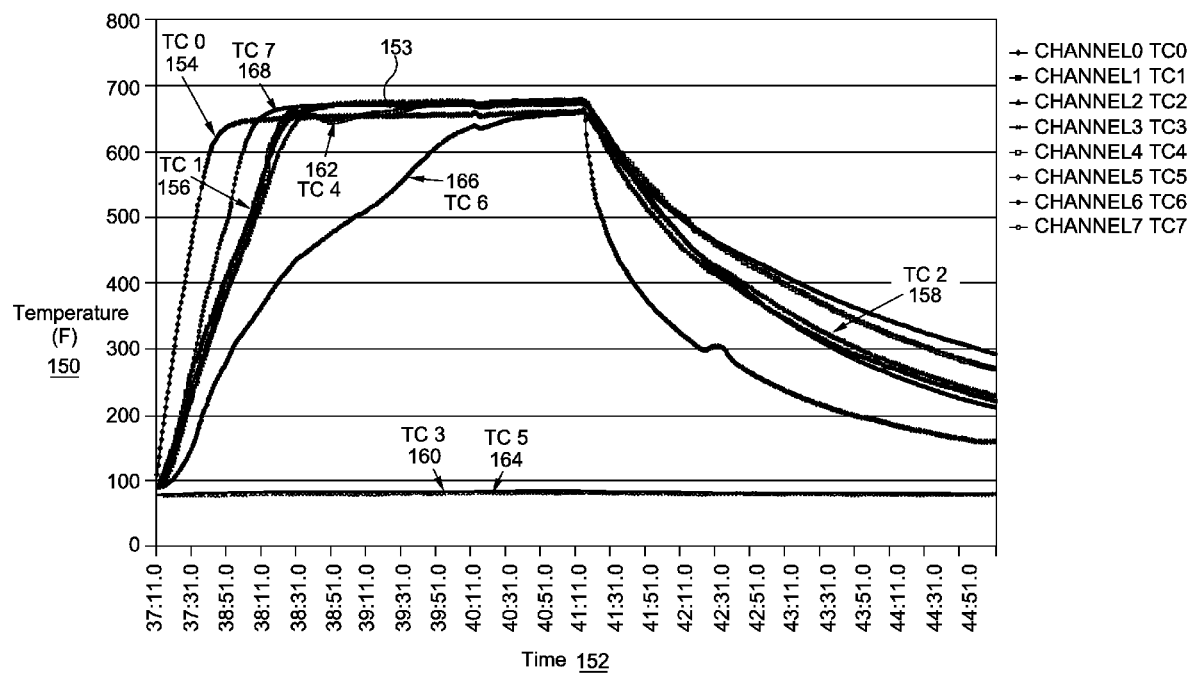
FIG. 6C is an illustration of a plot of experimental temperature data over time as recorded by thermal sensors located at various portions of a structure having differing thermal environments and illustrating the attainment of a substantially uniform temperature at the differing thermal environments across the structure.
Figure 6D:
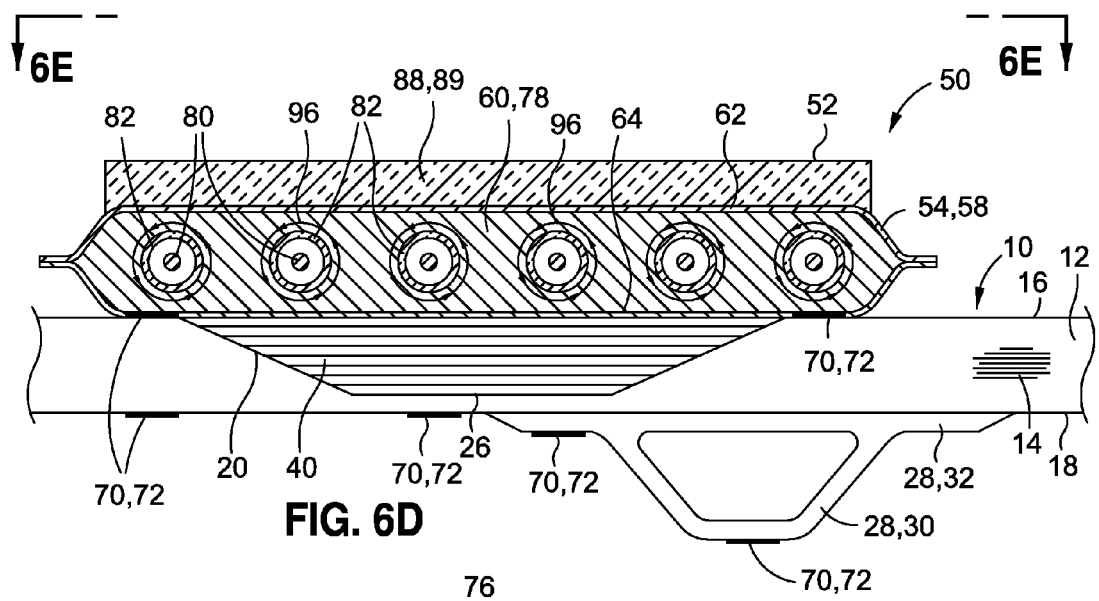
FIG. 6D is a sectional illustration of the heating blanket shown in FIG. 6 and illustrating the mounting of the heating blanket to a rework area of a composite structure having a heat sink (i.e., stringer) positioned on a right-hand side of the rework area.

Referring to FIG. 6C, shown is a graph of temperature 150 measured over a period of time 152 during heating of a test article using a heating blanket 54 (FIG. 6) having a susceptor sleeve 82 (FIG. 6) extending along the conductor. FIG. 6C illustrates the measurement of temperature 150 recorded during testing of the heating of a relatively large structure (not shown) for thermoplastic forming thereof. As can be seen in FIG. 6C, temperatures were measured and recorded by thermocouples TC0, TC1, TC2, TC3, TC4, TC5, TC6, TC7 corresponding to reference numbers 154, 156, 158, 160, 162, 164, 166, 168, respectively, positioned at several locations of the structure having differing thermal environments. The differing thermal environments resulted in different heating rates of the structure as measured by the thermocouples 154, 156, 158, 160, 162, 164, 166, 168. For example, the thermocouple TC6 166 measured temperature of at a location of the structure having a relatively slower heating rate as compared to the locations of the structure such as those represented by the thermocouples 154 and 168 which exhibited relatively high heating rates. FIG. 6C further illustrates that the heating blanket 54 (FIG. 6) heated all locations of the structure to the same Curie temperature 153 during the application of a relatively constant supply of alternating current to the conductor 80 (FIG. 6). In this regard, the heating blanket 54 increased and maintained the temperature of all locations of the structure to approximately 670° F. which was the desired temperature for thermoplastic forming. Upon attaining the desired temperature at all locations of the structure, the power supply was deactivated at 41 minutes and 11 seconds as illustrated in the graph of FIG. 6C.

Figure 6E:
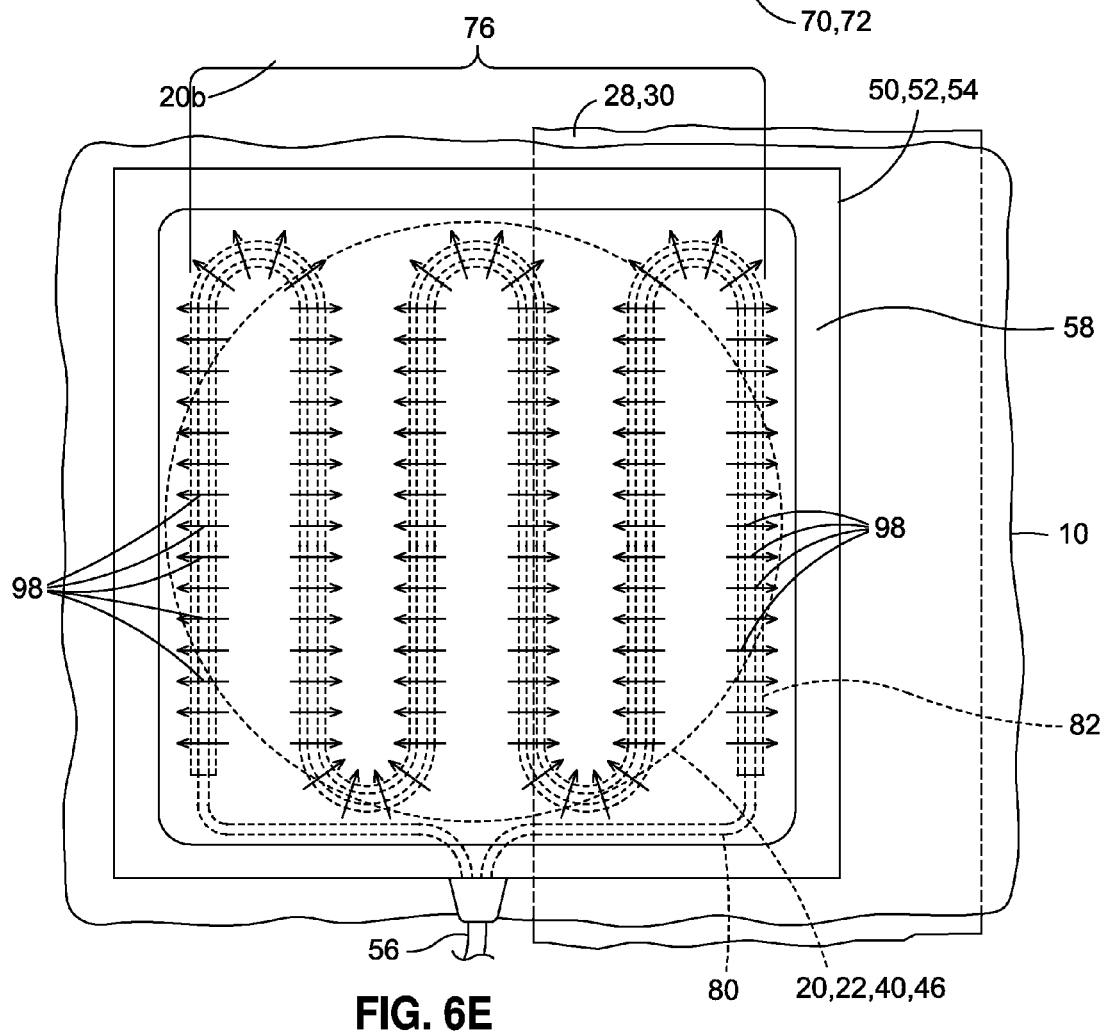
FIG. 6E is a top view illustration of the heating blanket applied to a patch and illustrating magnetic fields generated along the length of the susceptor sleeve in response to the application of alternating current to the conductor.
Figure 6F:
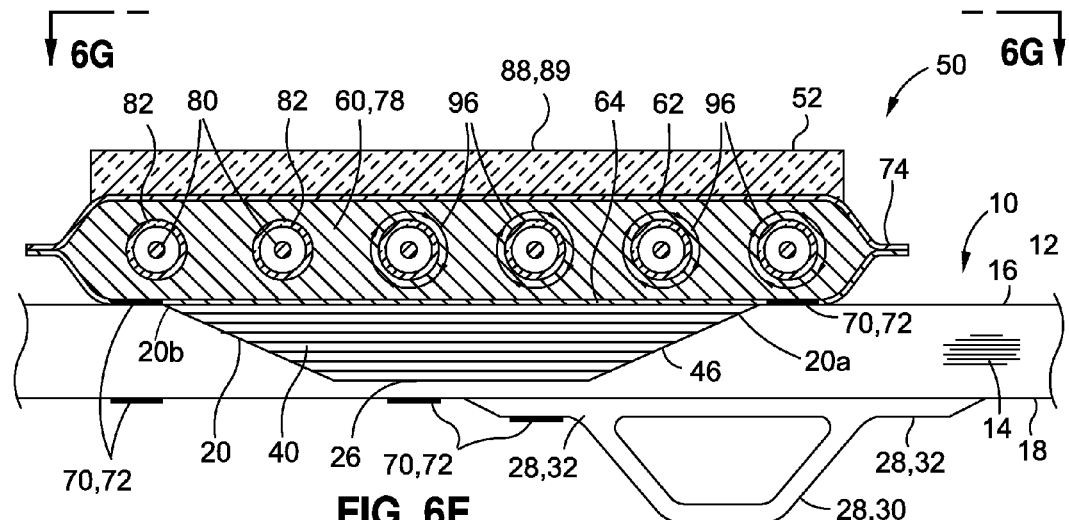
FIG. 6F is a cross-sectional illustration of the heating blanket of FIG. 6E and illustrating the lack of magnetic fields along the left-hand side of the conductor as a result of the susceptor sleeve becoming non-magnetic upon attaining the Curie temperature and the continued generation of the magnetic field on the right-hand side of the conductor as a result of the susceptor sleeve being below the Curie temperature in response to heat being drawn from the rework area by the heat sink (i.e., stringer)
Figure 6G:
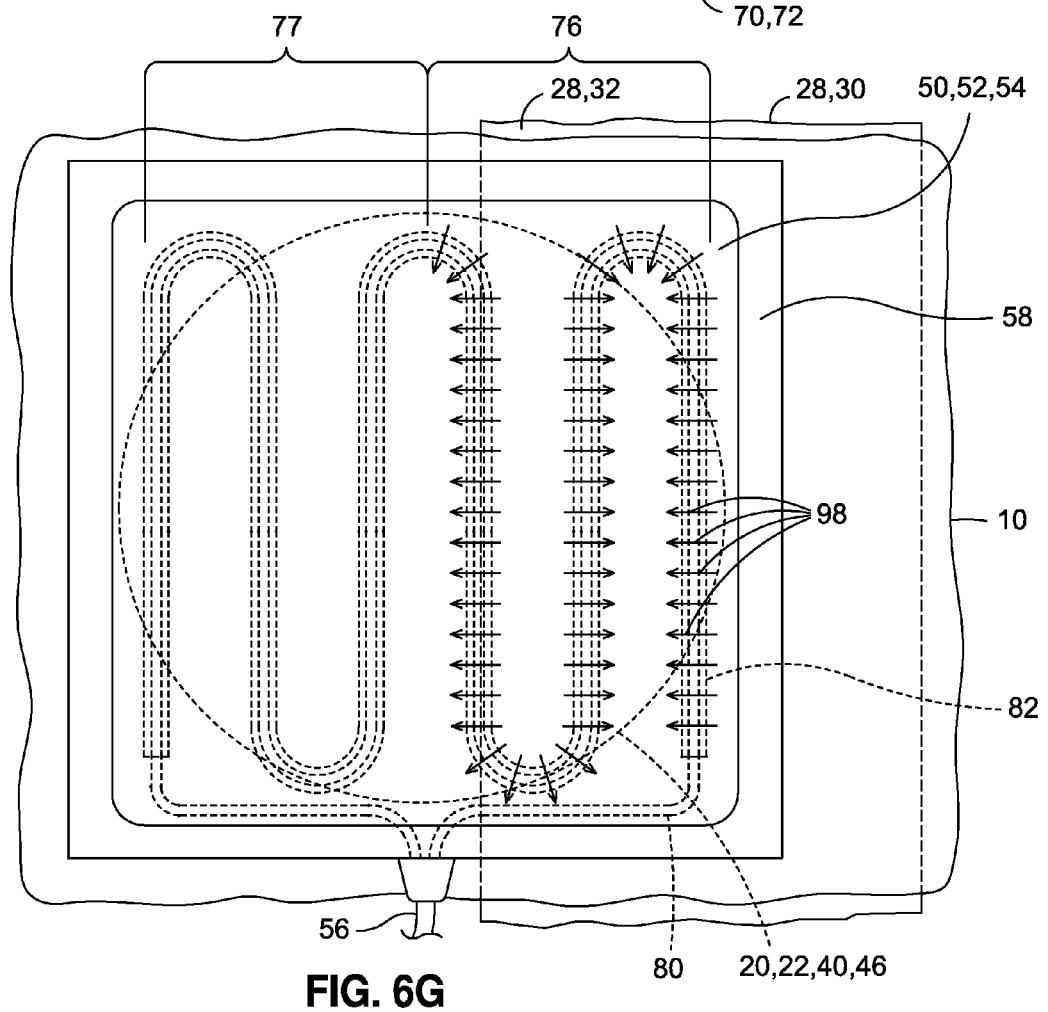
FIG. 6G is a top view illustration of the heating blanket of FIG. 6F and illustrating the lack of magnetic fields on the left-hand side of the conductor and the continued generation of the magnetic field on the right-hand side of the conductor in response to heat being drawn from the rework area by the heat sink.

Referring to FIGS. 6D-6G, shown is the heating blanket 54 configuration having the susceptor sleeve 82 substantially coaxially mounted to the conductor 80 and wherein the heating blanket 54 is installed over a patch 40 mounted within a rework area 20. As can be seen, the structure 10 includes a heat sink 28 configured as a stringer 30 on the lower surface 18 of the structure 10 which may draw heat from the rework area 20. FIG. 6E is a top view illustration of the heating blanket 54 installed on the patch 40 of FIG. 6D and illustrating magnetic field 96 lines generated during the application of alternating current to the conductor 80. As can be seen, the magnetic field 96 lines occur uniformly throughout the length of the conductor 80 as may occur during the initial stages of heating a composite structure 10 rework area 20. The application of the alternating current to the conductor 80 generates a magnetic field 96 which is concentrated in the susceptor sleeve 82 along the length of the conductor 80 causing induced currents which resistively heat the susceptor sleeve 82 and adjacent materials such as the matrix 78 within which the susceptor sleeve 82 and conductor 80 may be embedded. As the susceptor sleeve 82 is initially heated, the magnetic material in the susceptor sleeve 82 maintains its magnetic properties resulting in continuous inductive heating thereof.

Referring to FIGS. 6F-6G, it can be seen that the magnetic material in the susceptor sleeve 82 adjacent the heat sink 28 and stringer 30 on the right-hand side 20a (FIG. 6F) of the heating blanket 54 continues to be magnetic while the portion of the conductor 80 and susceptor sleeve 82 located away from the heat sink 28 on the left-hand side 20b (FIG. 6F) have reached the Curie temperature such that the magnetic properties of the susceptor sleeve 82 disappear as the magnetic fields 96 are no longer concentrated in the susceptor sleeve 82. The susceptor sleeve 82 becomes non-magnetic in such portions and the induced currents and resistive heating of the susceptor sleeve 82 diminishes to a level sufficient to maintain a temperature of the susceptor sleeve 82 at the Curie temperature. In this regard, the non-magnetic portion 77 of the heating blanket 54 illustrated in FIG. 6G provides reduced heat to the rework area 20 while the magnetic portion 76 continues to provide a greater amount of heat to the rework area 20 in order to attain the adhesive curing temperature and/or composite material curing temperature. Once the magnetic portion 76 illustrated in FIG. 6G reaches the Curie temperature, the magnetic material of the susceptor sleeve 82 in that portion becomes non-magnetic and the resistive heating is reduced to a sufficiently low level to maintain the rework area 20 at the desired temperature.

As can be seen in FIG. 6F, the magnetic blanket may include thermal sensors 70 such as thermocouples 72 which may be strategically located between the blanket and the upper surface 16 of the structure 10 adjacent to the rework area 20 for monitoring the temperature of the structure 10. Data from the thermocouples 72 may be provided to the controller in order to monitor the power supply. Likewise, thermal sensors 70 may provide a means for sensing and monitoring the temperature of the heating blanket to facilitate regulation of the magnitude or frequency of alternating current supplied to the conductor. The heating blanket may include an indicating mechanism 74 such as a blinking light (not shown) in order to indicate the attainment of the Curie temperature by the susceptor sleeve 82.

Referring now to FIGS. 7-8, shown is an alternative embodiment of the heating blanket 54 having ferromagnetic particles 84 embedded within the matrix 78. The heating blanket 54 may be constructed similar to that which was described with regard to the induction heating embodiment illustrated in FIGS. 4-6G. The heating blanket 54 shown in FIGS. 7-8 may include a power supply 90 (FIG. 5) for generating alternating current at a relatively high frequency. For example, the frequency of alternating current provided to the heating blanket 54 may be approximately 1 kHz to 300 kHz at an amperage of between approximately 10 amps and 1000 amps and a voltage of between approximately 10 volts to 300 volts. In a preferable embodiment, the frequency of the alternating current is less than approximately 20 kHz in order to minimize unwanted inductive heating of electrically conductive materials in the structure 10 (FIG. 8E).

The housing 58 of the heating blanket 54 configuration shown in FIGS. 7-8 may be similar to the housing 58 described above with reference to FIGS. 4-6G wherein the housing 58 is preferably formed of a flexible material and which contains a thermally conductive matrix 78. The housing 58 may include an insulation layer 88 on one side thereof in order to minimize heat loss to the environment. The conductor 80 may likewise be formed of materials similar to that described above with regard to the induction heating configuration illustrated in FIGS. 4-6G wherein the conductor 80 is formed of flexible wire such as Litz wire and is arranged in a meandering pattern or other suitable arrangement.

In the embodiment illustrated in FIGS. 7-8, the ferromagnetic particles 84 have a Curie temperature that is preferably substantially greater than the desired temperature of the structure to be heated by the heating blanket 54. In this regard, the ferromagnetic particles 84 preferably have high hysteretic losses which manifest as heat given off at a temperature that is lower than the Curie temperature of the ferromagnetic particles 84. The ferromagnetic particles 84 are preferably dispersed or embedded within at least a portion of the matrix 78 or throughout the entire matrix 78 in a uniform manner. The ferromagnetic particles 84 in the configuration illustrated in FIGS. 7-8 are heated by hysteretic heating in response to the magnetic field 96 resulting from the application of the alternating current to the conductor 80.

FIG. 8 illustrates the magnetic field 96 pattern circulating through the ferromagnetic particles 84 embedded within the matrix 78 inside the housing 58. The ferromagnetic particles 84 are preferably selected such that the Curie temperature thereof is substantially greater than the desired temperature of the structure to be heated in order to account for diminishing hysteretic heating as temperatures increase in the ferromagnetic particles 84. Hysteretic heating of the ferromagnetic particles 84 causes a leveling off of the temperature prior to the ferromagnetic particles 84 reaching the Curie temperature. The leveling off of the temperature is due in part to the decrease in the amount of heat that is generated with increasing temperature. The decrease in generated heat may also be in response to thermal conduction of heat from the ferromagnetic particles 84 such as into a structure being heated.

Referring to FIG. 8A, shown is a graph of temperature 170 versus time 172 and illustrating a plot of temperatures measured during hysteretic heating of nickel ferromagnetic particles having a Curie temperature of approximately 660° F. It can be seen that temperature increases at a relatively rapid rate during the initial heating of the ferromagnetic particles. The temperature of the ferromagnetic particles attains a leveling off at approximately 550° F. (i.e., the hysteretic temperature 174) which is approximately 25% less than the Curie temperature. In this regard, the heating blanket 54 (FIG. 8) may include ferromagnetic particles 84 (FIG. 8) that are selected such that the Curie temperature thereof is greater by a predetermined amount than the temperature at which the structure 10 (FIG. 8C) is to be heated. The ferromagnetic particles for which the temperature plot is illustrated in FIG. 8A may comprise a 2% concentration of a matrix formed of polyetheretherketone (PEEK). However the matrix may comprise any suitable material having thermally conductive properties and which preferably exhibits low electrical resistivity.

Referring to FIGS. 7 and 8, in a further embodiment, the heating blanket 54 may include superparamagnetic particles 86 that absorb energy from the magnetic field 96 produced by applying alternating current to the conductor 80. The superparamagnetic particles 86 undergo relaxation heating in response to exposure to the magnetic field 96 generated by the alternating current passing through the conductor 80. The Curie temperature of the superparamagnetic particles 86 is dependent in part on the size of the superparamagnetic particles 86. More specifically, the superparamagnetic particles 86 convert heat from the magnetic field 96 by relaxation heating at a rate which is dependent upon the size (i.e., diameter) of the superparamagnetic particles 86.

The Curie temperature of the superparamagnetic particles 86 may also be dependent upon a temperature range of the relaxation heating of the superparamagnetic particles 86. For example, the temperature range may correspond to a frequency of the alternating current and/or an amplitude of the alternating current. The temperature range may be altered by adjusting the frequency and/or the amplitude of the alternating current provided to the conductor 80. The superparamagnetic particles 86 generate heat within a relatively narrow temperature band such that the size of the superparamagnetic particles 86 may be selected to correspond to the desired temperature at which the structure is to be heated. For example, a superparamagnetic particle 86 formed of iron oxide having a size ranging from approximately 22 to 24 nm generates heat in the range of from 0° C. (i.e., room temperature) to approximately 150° C.

Referring to FIG. 8B, shown is a plot of power output 182 (i.e., heat) measured in watts-per-square-foot versus temperature 184 for iron oxide superparamagnetic particles in response to a conductor receiving alternating current at a frequency of 3000 Hz. In the plot of FIG. 8B, shown is a first particle size 186 having a Curie temperature band that falls below 0° C. and is therefore not visible on the graph. The second particle size 188 illustrated in FIG. 8B has a diameter of approximately 22 nm which occupies a Curie temperature 190 band that is different than the temperature band at which the third particle size 192 generates heat. More specifically, the third particle size 192 has a diameter of approximately 24 nm and generates heat at a Curie temperature 194 in the range of approximately 0° C. to approximately 150° C. The fourth particle size 196 illustrated in the graph of FIG. 8B generates heat at a Curie temperature 198 starting at approximately 100° C.

As may be appreciated, the superparamagnetic particles 86 (FIG. 8) may be selected in order to provide a plurality of particle sizes generating heat within a corresponding plurality of temperature ranges. The location of the temperature ranges can also be adjusted by changing the frequency of the alternating current passing through the conductor 80 (FIG. 8). In this manner, a heating blanket 54 (FIG. 8) formed with superparamagnetic particles 86 can be configured to provide heat at different temperatures by changing the frequency of the alternating magnetic field such as by changing the frequency of the alternating current. The frequency of the alternating magnetic field may also be changed by adjusting the voltage output of the power supply 90 (FIG. 5).

The superparamagnetic particles 86 for the configurations illustrated in FIGS. 7-8 may be comprised of any suitable magnetic material including, but not limited to, any suitable metal, alloy, metal oxide or ferrite as described above with regard to the magnetic material from which the susceptor sleeve 82 may be formed. For example, the metals or metal alloys from which the superparamagnetic particles 86 may be fabricated may include, but are not limited to, iron, cobalt, nickel and copper or any other suitable metal or alloy thereof Referring now to FIGS. 8C-8D, shown is the heating blanket 54 comprising either the ferromagnetic particles 84 or the superparamagnetic particles 86 embedded within the matrix 78. The heating blanket 54 is shown installed on a patch 40 received within a rework area 20. The ferromagnetic 84 or superparamagnetic particles 86 which may be embedded in all or a portion of the matrix 78 are directly heated by the magnetic field 96 which, in turn, thermally heats the matrix 78 by conduction. The structure 10 to which the heating blanket 54 is installed is likewise heated by thermal conduction when the superparamagnetic particles 86 continue to exhibit magnetic properties below the Curie temperatures. In this regard, FIG. 8D illustrates that the entirety of the matrix is magnetic as indicated by the magnetic portion 76.

Referring to FIGS. 8E-8F, shown is a cross-sectional illustration and a top view illustration of the heating blanket 54 showing the magnetic field 96 being concentrated on the right-hand side 20a (FIG. 8E) of the heating blanket 54 relative to the left-hand side 20b (FIG. 8E) representing a reduction in heat generated by the ferromagnetic particles 84 as the temperature approaches a hysteretic temperature of the ferromagnetic particles 84. As was indicated above, the hysteretic temperature represents the temperature at which the ferromagnetic particles 84 have relatively large hysteresis losses. The hysteresis losses of the ferromagnetic particles 84 diminish to relatively low levels at temperatures below the Curie temperature. In this regard, FIG. 8E represents those portions of the ferromagnetic particles 84 within the matrix 78 that undergo a relatively rapid decrease in heat generation with increasing temperature such that the temperature in the non-magnetic portion 77 illustrated in FIG. 8F is below the Curie temperature of the ferromagnetic particles 84. However the magnetic portion 76 of the heating blanket 54 illustrated in FIG. 8F continues to provide heat to the rework area 20 of the composite structure 10 as a result of the heat being absorbed by the heat sink 28 on the lower surface 18 of the composite structure 10.

Referring still to FIGS. 8E-8F, for the configuration of the heating blanket 54 having superparamagnetic particles 86, the magnetic portion 76 illustrated in FIG. 8F continues to undergo relaxation heating at a rate which is dependent upon the size or diameter of the superparamagnetic particles 86. Temperature increase slows as the superparamagnetic particles 86 approach or exceed the Curie temperature. In this regard, heat output from a heating blanket 54 having superparamagnetic particles 86 is reduced when the temperature of the superparamagnetic particles 86 is either greater than or less than the Curie temperature.

In the embodiments illustrated in FIGS. 7-8F, the density of the ferromagnetic particles 84 or superparamagnetic particles 86 in the matrix 78 may be selected in consideration of the desired flexibility of the heating blanket 54. For example, the density or amount of ferromagnetic 84 or superparamagnetic particles 86 in the matrix 78 has an effect on the stiffness or flexibility of the heating blanket 54. A higher density of particle may reduce the flexibility of the heating blanket 54. In this regard, the ferromagnetic 84 or superparamagnetic particles 86 may be as large as practical but may be limited to approximately 45% by volume of the matrix 78 and, more preferably, may be limited to less than 20% by volume of the matrix 78 in order to retain flexibility of the heating blanket 54.

In each of the above-described embodiments including the induction heating embodiment illustrated in FIGS. 4-6G and the hysteretic heating and relaxation heating embodiments comprising, respectively, ferromagnetic 84 and superparamagnetic particles 86 illustrated in FIGS. 7-8F, magnetic materials for each of the configurations may be selected depending upon the desired temperature of the structure 10 to be heated. For example, magnetic materials may be available for temperature ranges from approximately 150° F. to approximately 2050° F. by selecting magnetic materials having appropriate Curie temperatures. However, magnetic materials for each of the configurations may be selected to provide heat at any temperature or within any temperature range.

In the above-described heating blanket 54 (FIG. 4) configurations, uniform heating of a structure 10 (FIG. 1) may be attainable by virtue of the rate of heat reduction and the ability to maintain a desired temperature being dependent upon the temperature at any location of the heating blanket 54. More specifically, the temperature of the heating blanket 54 is dependent upon the temperature of the adjacent location of the structure 10 that is in thermal contact with the heating blanket 54. The Curie temperature may be selected to correspond to the desired article temperature. For example, for a composite structure 10 formed of graphite-epoxy and/or fiberglass composite material, a patch 40 (FIG. 3) formed in a composite skin 12 (FIG. 3) thickness of one-half inch will include a bondline 46 (FIG. 3) that may be generally cooler than the temperature at the interface of the heating blanket 54 with the composite structure 10.

Locations in the rework area 20 (FIG. 3) such as the bondline 46 (FIG. 3) that have attained the adhesive curing temperatures may continue to receive a diminished level of heat that is sufficient to maintain the temperature of the magnetic material and heating blanket 54 (FIG. 4) at the Curie temperature or at the hysteretic temperature for the hysteretic heating configuration. Locations in the patch 40 (FIG. 3) that are at a relatively lower temperatures as a result of a heat sink 28 (FIG. 3) or other thermal variations may continue to receive heat at a greater rate until reaching the adhesive curing temperature or composite material curing temperature which may be selected to be close to the Curie temperature of the magnetic material in the heating blanket 54. Advantageously, once the magnetic materials are selected and assembled with the blanket assembly 52 (FIG. 4), the heating blanket 54 may be operated substantially autonomously to uniformly heat the structure 10 (FIG. 3) without manual control of the temperature of the heating blanket. In this manner, the heating blanket 54 provides a means for uniformly heating the structure 10 (FIG. 3) without overheating or under heating any locations.

Figure 9:
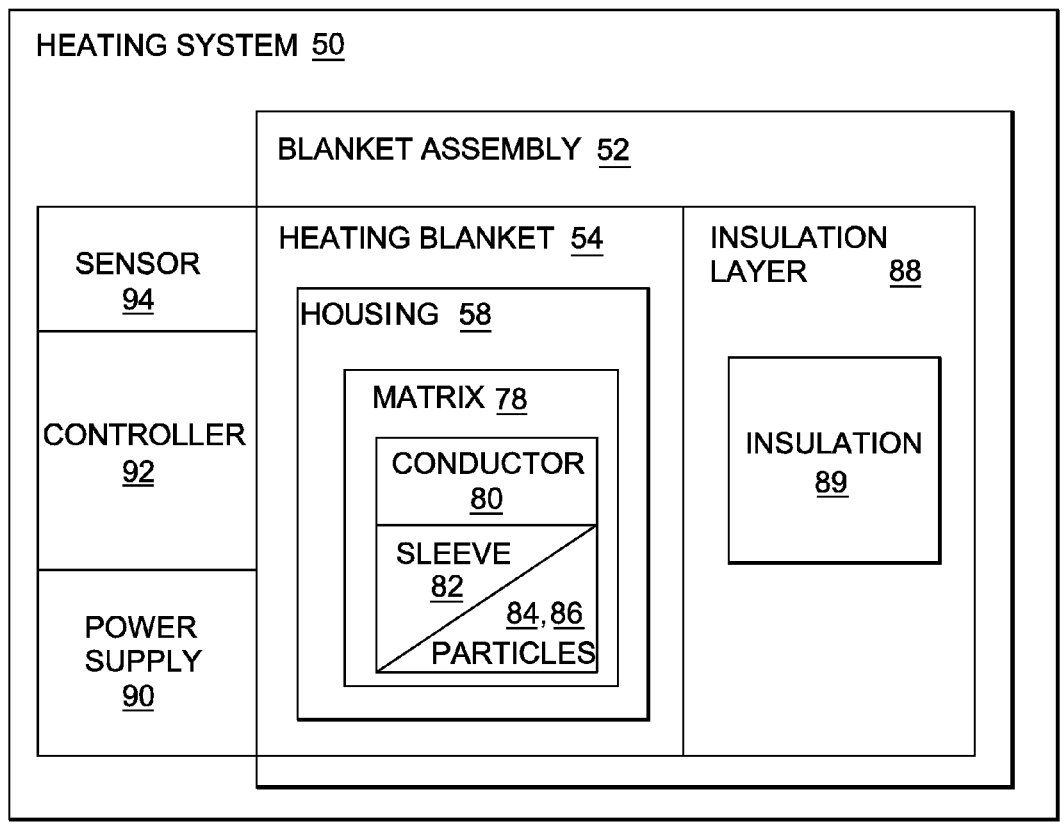
FIG. 9 is an illustration of a functional block diagram of a heating system comprising a blanket assembly which may be powered by a power supply.

Referring briefly to FIG. 9, shown is a block diagram illustrating a heating system 50 as may be implemented in any one of the configurations described above. The heating system 50 may include a blanket assembly 52 which may comprise a heating blanket 54 and insulation layer 88 applied thereto. The heating blanket 54 may include a housing 58 which may form an interior for housing 58 the conductor 80 and the magnetic material in any one of the above-described configurations. The housing 58 may include a matrix 78 through which the conductor 80 may be extended. The conductor 80 may include the susceptor sleeve 82 extending along a length and which may be formed as a unitary cylinder or as a flexible braided sleeve disposed in non-electrically contacting relation to the conductor 80 along any portion thereof Referring still to FIG. 9, in a further configuration, the heating blanket 54 may include ferromagnetic particles 84 embedded in the matrix 78 which are exposed to a magnetic field that is generated when the alternating current is applied to the conductor 80. Ferromagnetic particles 84 may be selected to have a Curie temperature that is greater than the desired temperature of the structure to be heated. In this regard, the ferromagnetic particles 84 preferably have high hysteresis losses when exposed to the magnetic field. The Curie temperature of the ferromagnetic particles 84 is preferably greater than the desired temperature of the structure to be heated in consideration of the reduction in hysteresis losses to relatively low levels below the Curie temperature as described above. The matrix 78 may also include superparamagnetic particles 86 embedded within the matrix 78 for heating by relaxation at a rate and within a temperature range corresponding to the size or diameter of the superparamagnetic particles 86 and the frequency of the alternating current.

The heating blanket 54 may include the insulation layer 88 which may be bonded to one of the upper and lower face sheets 62, 64 (FIG. 4). The insulation layer 88 may include any suitable insulation 89 such as, without limitation, silicone. The insulation layer 88 may prevent heat losses to the environment on the side of the heating blanket 54 opposite the structure. The blanket assembly 52 may be connected to a power supply 90 for providing alternating current to the conductor 80 which may be connected to a controller 92 and/or a sensor 94 for controlling the power supply 90 and sensing the voltage thereof.

Figure 10:
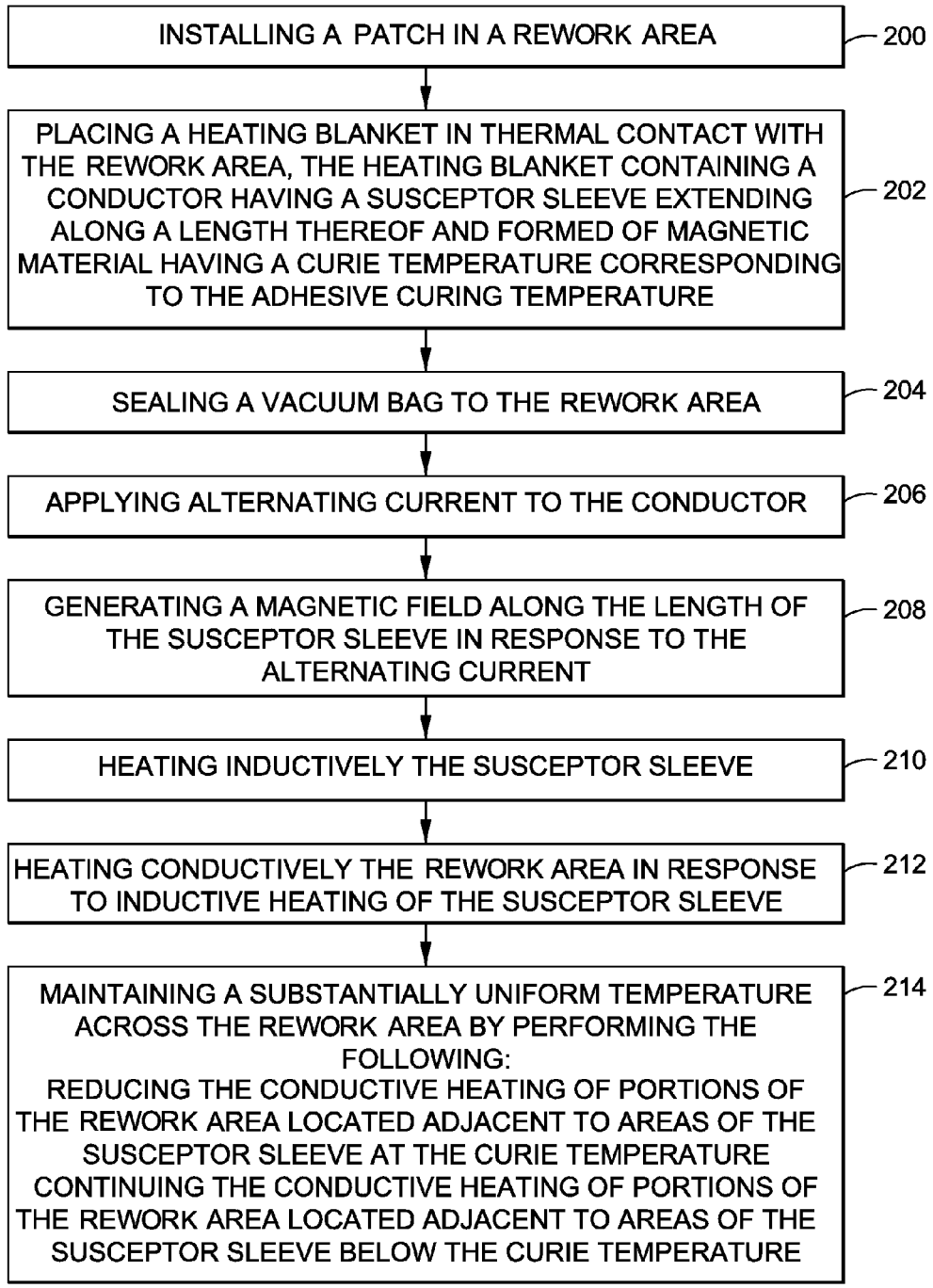
FIG. 10 is an illustration of a flow diagram of a methodology of uniformly heating a composite structure rework area by inductively heating a susceptor sleeve mounted to a conductor upon the application of alternating current thereto.

Referring to FIG. 10, shown is an illustration of a methodology for heating a structure such as a composite structure 10 (FIG. 3) using a heating blanket 54 (FIG. 4) having a susceptor sleeve 82 (FIG. 4) extended along a conductor 80 (FIG. 4). The method may comprise preparing the structure 10 (FIG. 3) for the heating blanket such as by installing a patch 40 (FIG. 1) in a rework area of the composite structure 10. Adhesive may be applied between the patch 40 (FIG. 1) and the rework area 20 (FIG. 1) for which the heating blanket 54 may be employed to increase the curing temperature in step 200. In step 202, the heating blanket may be placed in thermal contact with the rework area. As indicated above, the susceptor sleeve 82 (FIG. 4) may be formed of a magnetic material having a Curie temperature that corresponds to the desired temperature of the structure 10. For example, the Curie temperature may correspond to the adhesive curing temperature for bonding the patch to the rework area 20 (FIG. 1).

Upon application of the heating blanket to the structure, a vacuum bag assembly 100 (FIG. 2) may be applied to seal the rework area 20 (FIG. 1) to the composite structure 10 (FIG. 3) in step 204. Alternating current may be applied to the conductor in step 206 in order to generate a magnetic field 96 (FIG. 6) in step 208 which may extend along the length of the susceptor sleeve 82 (FIG. 4) in response to the application of the alternating current. Step 210 may comprise heating the susceptor sleeve inductively in response to the magnetic field. The heating rate may be increased by increasing the frequency of the alternating current. However, the alternating current may be maintained below a predetermined level to minimize inductive heating of adjacent structure and to minimize uncontrolled resistive heating of the conductor 80 (FIG. 4).

Step 212 may comprise heating the rework area 20 (FIG. 1) due to thermal conduction of the heat from the heating blanket 54 (FIG. 4) into the structure 10 (FIG. 3). The heat from the inductively heated susceptor sleeve 82 (FIG. 4) is transmitted from the matrix surrounding the susceptor sleeve into the structure to which the heating blanket is mounted. The method may further comprise altering the rate of inductive heating of the susceptor sleeve 82 (FIG. 4) by adjusting the frequency of the altering current applied to the conductor 80 (FIG. 4). Step 214 may comprise maintaining a substantially uniform temperature such as at the approximate Curie temperature of the susceptor sleeve 82 (FIG. 4) without substantial variation across the rework area 20 (FIG. 1).

The step of maintaining the uniform temperature may include reducing the conductive heating of portions of the rework area that are located adjacent to the areas of the susceptor sleeve 82 (FIG. 4) that have become non-magnetic upon attaining the Curie temperature. In this regard, the inductive heating of the susceptor sleeve may be reduced in correspondence to a reduction in the voltage occurring across the conductor 80 (FIG. 4) due to the relatively constant alternating current provided thereto by the power supply. The reduction of voltage across the conductor 80 (FIG. 4) may result in maintaining the susceptor sleeve 82 (FIG. 4) at the Curie temperature. In this manner, the structure 10 (FIG. 3) may be uniformly heated by reducing the inductive heating of the portions of the susceptor sleeve that are at the Curie temperature while continuing the inductive heating of the portions of the susceptor sleeve 82 (FIG. 4) that are below the Curie temperature.

The magnetic material for the susceptor sleeve may be selected such that the Curie temperature thereof corresponds to the desired temperature of the structure 10 (FIG. 3). For example, in applying heat to a patch 40 (FIG. 3) being adhesively bonded to a rework area 20 (FIG. 1), the Curie temperature preferably corresponds to the adhesive curing temperature. As the temperature of the adhesive approaches the Curie temperature, the inductive heating of the susceptor sleeve 82 (FIG. 4) may be reduced by an autonomous reduction in the voltage across the conductor 80 (FIG. 4) while maintaining the alternating current at a constant level. The conductor voltage may be monitored such that upon attainment of the desired temperature (i.e., adhesive curing temperature), the conductor voltage may stabilize at a reduced level. The heating blanket 54 (FIG. 4) may include an indicating mechanism such as a blinking light or other suitable device to indicate attainment of the desired temperature when the conductor voltage stabilizes. In this regard, certain portions of the structure 10 (FIG. 3) may attain the desired temperature prior to other portions of the other structure. The inductive heating of the portions of the susceptor sleeve 82 (FIG. 4) located proximate the portions of the structure that have attained the desired temperature may be reduced while portions of the structure 10 (FIG. 3) located proximate portions of the susceptor sleeve that are below the Curie temperature may continue to be heated.

Figure 11:
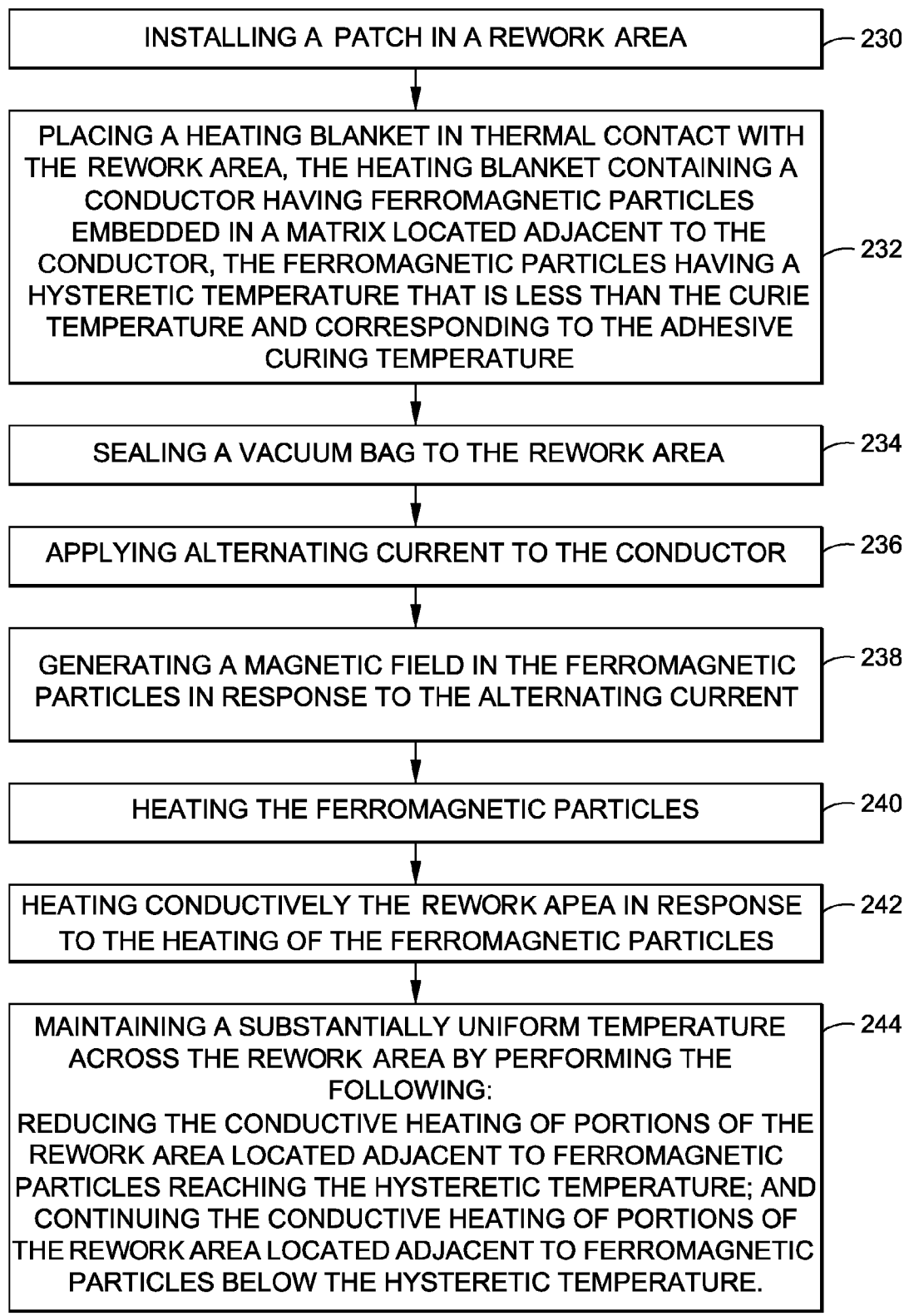
FIG. 11 is an illustration of a flow diagram of a methodology of uniformly heating a composite structure rework area by hysteretic heating of ferromagnetic particles embedded within a matrix surrounding the conductor.

Referring to FIG. 11, shown is an illustration of a flow diagram illustrating a methodology for heating a structure such as a composite structure for repair of a rework area 20 (FIG. 1) by hysteretic heating. The method may comprise step 230 of installing the patch 40 (FIG. 3) in the rework area followed by placing the heating blanket 54 (FIG. 4) in thermal contact with the rework area in step 232. As was indicated above, the heating blanket may contain the conductor 80 (FIG. 4) having ferromagnetic particles 84 (FIG. 7) embedded in the matrix. The ferromagnetic particles are heated by exposure to the magnetic field generated during application of the alternating current to the conductor 80 (FIG. 4). The ferromagnetic particles are preferably selected such that the hysteretic temperature thereof is less than the Curie temperature and which preferably corresponds to the desired temperature of the structure such as the desired temperature of the adhesive bonding a patch 40 (FIG. 3) to a rework area.

Step 234 of FIG. 11 may include sealing the rework area with a vacuum bag as described above and applying alternating current to the conductor extending through the heating blanket 54 (FIG. 4) in step 236. Step 238 may comprise generating the magnetic field in response to the alternating current such that the ferromagnetic particles 84 (FIG. 7) are exposed thereto. Step 240 may comprise heating the ferromagnetic particles hysteretically wherein the temperature of the ferromagnetic particles increases toward the Curie temperature and wherein the magnetic particles are selected to have high hysteretic losses. Step 242 may comprise heating the rework area 20 (FIG. 1) conductively in response to the hysteretic heating of the ferromagnetic particles within the matrix.

Step 244 may include maintaining a substantially uniform temperature across the rework area of the structure 10 (FIG. 3) by either reducing the conductive heating for those portions of the rework area 20 (FIG. 1) that are located adjacent to ferromagnetic particles 84 reaching the hysteretic temperature, or, continuing to conductively heat the portions of the rework area that are located adjacent to ferromagnetic particles 84 that are below the hysteretic temperature.

Figure 12:
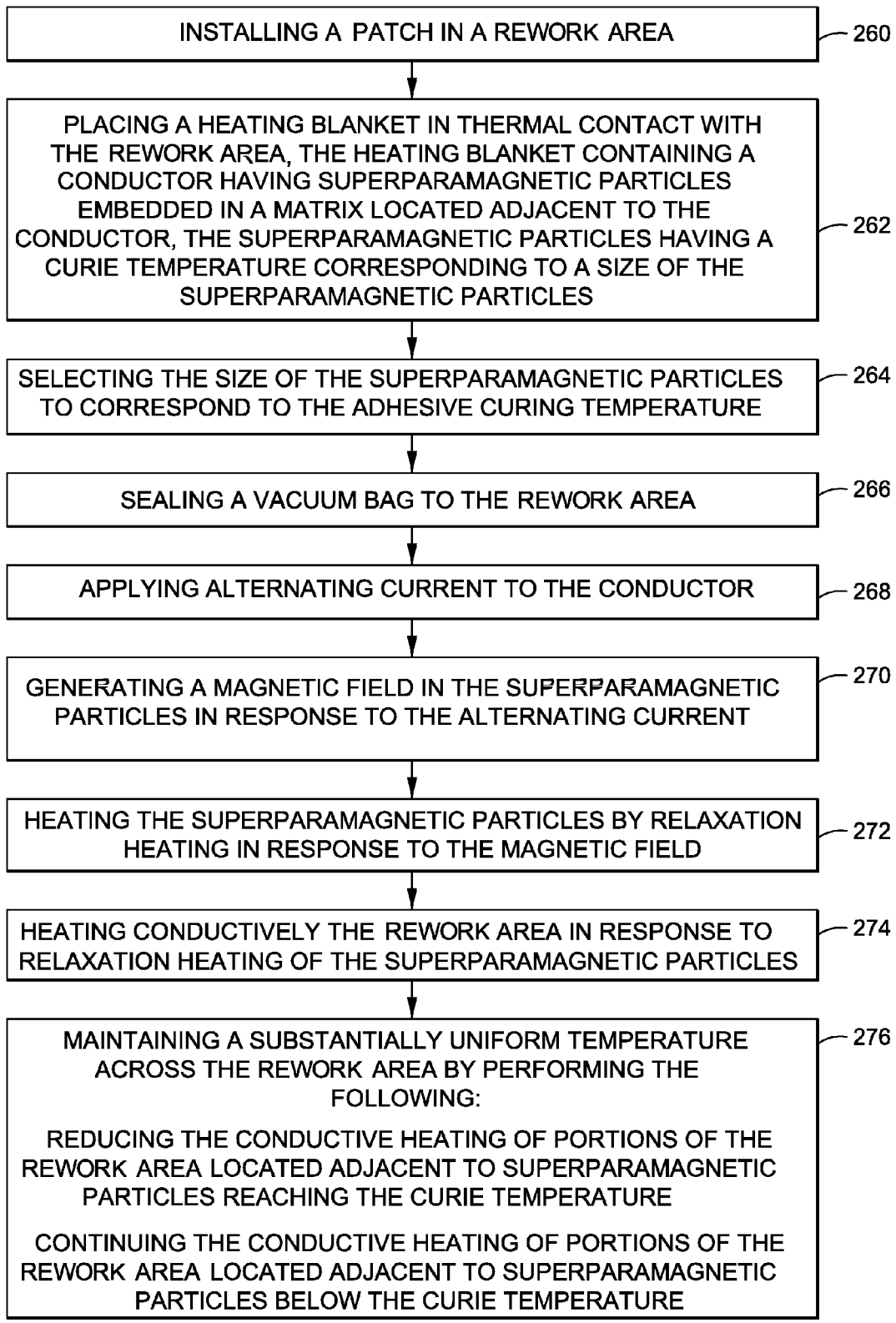
FIG. 12 is an illustration of a flow diagram of a methodology for uniformly heating a composite structure rework area by relaxation heating of superparamagnetic particles embedded within a matrix surrounding the conductor.

Referring to FIG. 12, shown is an illustration of a flow diagram illustrating a methodology for uniformly heating a structure 10 (FIG. 3) such as a composite structure rework area 20 (FIG. 1) to which a patch 40 (FIG. 3) may be bonded using adhesive. The method illustrated in FIG. 11 may include installing the patch in the rework area in step 260 and placing the heating blanket 54 (FIG. 4) in thermal contact with the rework area in step 262 as described above. The heating blanket may include superparamagnetic particles 86 (FIG. 7) embedded in the matrix that are preferably located adjacent to the conductor 80 (FIG. 4) for exposure of superparamagnetic particles to the magnetic field. The superparamagnetic particles preferably have a Curie temperature corresponding to the size of the superparamagnetic particles as was described above.

In this regard, the method may comprise step 264 of selecting the size of the superparamagnetic particles 86 (FIG. 7) to correspond to the desired temperature of the structure 10 (FIG. 3) such as the adhesive curing temperature used in the patch 40 (FIG. 3). For example, the superparamagnetic particles may be selected to have a Curie temperature that comprises a temperature range for relaxation heating thereof. The temperature range preferably corresponds to the desired temperature at which the adhesive in the patch is to be cured or to the desired temperature of another location in the structure 10 (FIG. 3). In this regard, the method may comprise selecting particle sizes of the superparamagnetic particles 86 (FIG. 7) in order to generate heat within a corresponding plurality of Curie temperature ranges. In this manner, the structure 10 (FIG. 3) may be heated at different temperatures corresponding to the plurality of Curie temperatures.

Step 266 may comprise sealing a vacuum bag assembly 100 (FIG. 2) to the rework area 20 (FIG. 1) as described above. Step 268 may comprise applying alternating current to the conductor 80 (FIG. 4) in order to generate the magnetic field in step 270 and to which the superparamagnetic particles 86 (FIG. 7) may be exposed. Step 272 may comprise heating the superparamagnetic particles by relaxation heating. The rework area 20 (FIG. 1) may, in turn, be heated conductively in step 274 in response to the relaxation heating of the superparamagnetic particles. Step 276 of FIG. 12 may include maintaining the substantially uniform temperature across the rework area 20 (FIG. 1) by reducing the conductive heating of the portions of the structure 10 (FIG. 3) of or rework area that are located adjacent to superparamagnetic particles 86 (FIG. 7) that are approaching or nearing attainment of the Curie temperature (i.e., relaxation temperature). The method may further comprise continuing the conductive heating of those portions of the rework area 20 (FIG. 1) that are adjacent to superparamagnetic particles 86 that are below the Curie temperature.

Figure 13:
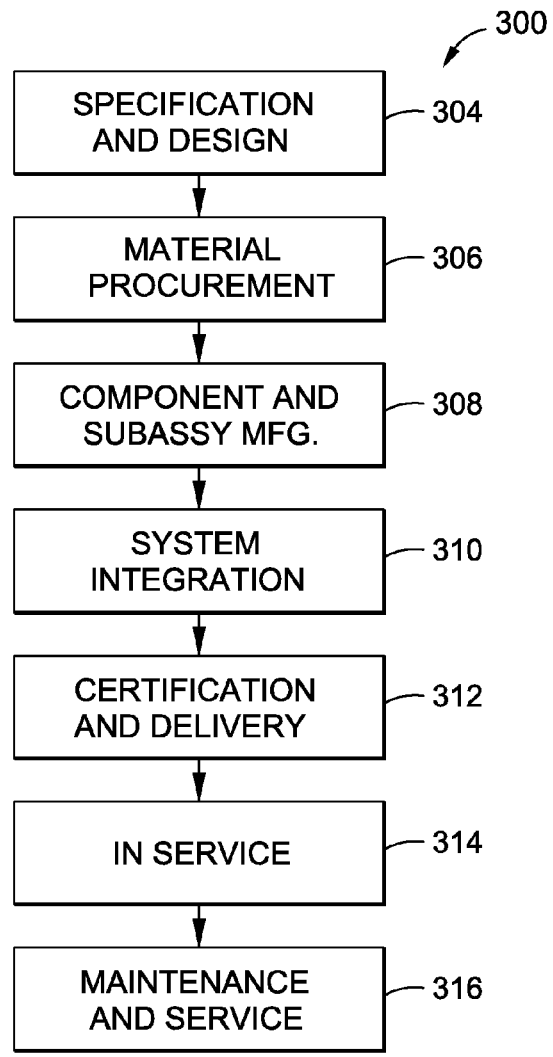
FIG. 13 is an illustration of a flow diagram of an aircraft production and service methodology.
Figure 14:
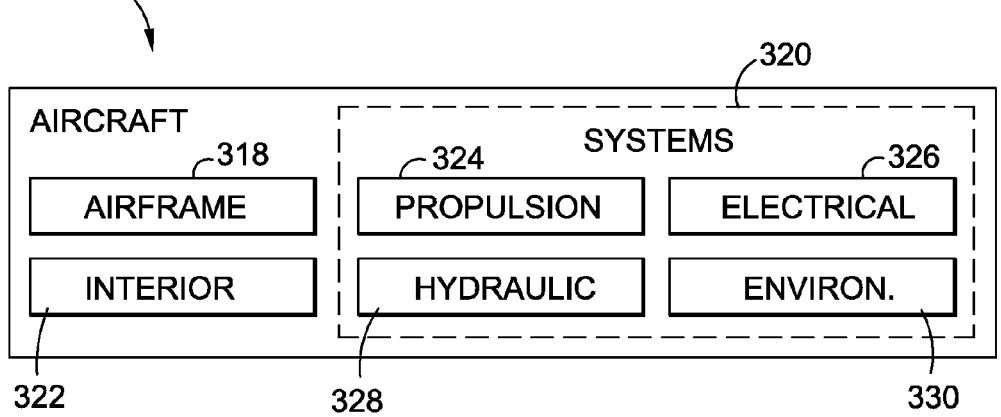
FIG. 14 is an illustration of a block diagram of an aircraft.

Referring to FIGS. 13-14, embodiments of the disclosure may be described in the context of an aircraft manufacturing and service method 300 as shown in FIG. 13 and an aircraft 302 as shown in FIG. 14. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service 314 by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service 314. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service 314, for example and without limitation, to maintenance and service 316.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A heating blanket, comprising:
a conductor for receiving current and generating a magnetic field in response thereto; and
a susceptor sleeve formed of magnetic material having a Curie temperature, the susceptor sleeve encirclling the conductor and extending along a length of the conductor for induction heating thereof in response to the magnetic field.

2. The heating blanket of claim 1 further comprising:
a matrix in thermal contact with the susceptor sleeve.

3. The heating blanket of claim 1 wherein:
the current is alternating current.

4. The heating blanket of claim 3 wherein:
the frequency of the alternating current is in the range of from approximately 1 kHz to approximately 300 kHz.

5. The heating blanket of claim 4 wherein:
the frequency of the alternating current is less than 20 kHz.

6. The heating blanket of claim 3 wherein:
the frequency of the alternating current is adjustable for altering a heating rate.

7. A heating blanket for heating a rework area of a composite structure, comprising:
a power supply for generating alternating current having a frequency of between approximately 1 kHz and 300 kHz and an amperage of between approximately 10 amps and 1000 amps at a voltage of between approximately 10 volts and 300 volts;
a housing formed of flexible material and containing a thermally conductive matrix;
an insulating layer disposed on one of opposing sides of the housing;
a conductor housed within the housing and extending in a meandering pattern through the thermally conductive matrix, the conductor receiving alternating current from the power supply for generating an alternating magnetic field in response to the alternating current; and a susceptor sleeve formed of magnetic material having a Curie temperature and being coaxially mounted to the conductor and electrically insulated therefrom for induction heating in response to the alternating magnetic field.

8. A heating blanket for heating a structure to a desired temperature, comprising:

a conductor for receiving alternating current and generating a magnetic field in response thereto; and a matrix disposed in proximity to the conductor and containing at least one of the following:

ferromagnetic particles for hysteretic heating thereof in response to the magnetic field, the ferromagnetic particles being selected such that the Curie temperature is substantially greater than the desired temperature;

superparamagnetic particles for relaxation heating thereof in response to the magnetic field, the superparamagnetic particles having a Curie temperature corresponding to a size of the superparamagnetic particles.

9. The heating blanket of claim 8 wherein:
the frequency of the alternating current is in the range of from approximately 1 kHz to approximately 300 kHz.

10. The heating blanket of claim 8 wherein:
the alternating current is substantially constant.

11. The heating blanket of claim 8 wherein:
the Curie temperature comprises a temperature range of the superparamagnetic particles.

12. The heating blanket of claim 11 wherein:
the temperature range corresponds to at least one of a frequency and an amplitude of the alternating.

13. A method of heating a structure, comprising:
heating inductively a susceptor sleeve in response to a magnetic field, the susceptor sleeve encircling a conductor and extending along a length of the conductor;
heating conductively a structure in thermal contact with the susceptor sleeve; and
reducing the inductive heating of the susceptor sleeve when the susceptor sleeve becomes non-magnetic upon reaching a Curie temperature of the susceptor sleeve.

14. The method of claim 13 further comprising:
applying alternating current to a conductor having the susceptor sleeve mounted thereto, the susceptor sleeve being formed of magnetic material having the Curie temperature.

15. The method of claim 14 further comprising:
generating the magnetic field along the length of the susceptor sleeve in response to the alternating current.

16. The method of claim 13 further comprising:
reducing the conductive heating of the structure.

17. The method of claim 13 wherein the step of reducing the inductive heating of the susceptor sleeve comprises:
reducing a voltage across the conductor to a level for maintaining the susceptor sleeve at the Curie temperature.

18. The heating blanket of claim 13 wherein the step of reducing the inductive heating of the susceptor sleeve comprises:

reducing the inductive heating of portions of the susceptor sleeve at the Curie temperature; and
continuing the inductive heating of the portions of the susceptor sleeve that are below the Curie temperature.

19. The method of claim 18 wherein the step of reducing the inductive heating of the susceptor sleeve comprises:
reducing a voltage across the conductor while maintaining the alternating current;
monitoring the reduction of the conductor voltage; and
indicating attainment of the desired temperature when the conductor voltage stabilizes.

20. A method of heating a structure, comprising:
applying alternating current to a conductor having ferromagnetic particles embedded in a matrix located adjacent to the conductor, the ferromagnetic particlesm having a Curie temperature and a hysteretic temperature that is less than the Curie temperature;
generating a magnetic field in the ferromagnetic particles in response to the alternating current;
heating the ferromagnetic particles;
heating conductively the structure; and
reducing the heating of the ferromagnetic particles when the ferromagnetic particles reach the hysteretic temperature.

21. The method of claim 20 further comprising:
selecting a desired temperature of the structure; and
selecting the ferromagnetic particles such that the Curie temperature is substantially greater than the desired temperature.

22. The method of claim 20 further comprising:
maintaining a substantially uniform temperature across the structure by performing at least one of the following:
reducing the conductive heating of portions of the structure located adjacent to ferromagnetic particles reaching the hysteretic temperature; and
continuing the conductive heating of portions of structure located adjacent to ferromagnetic particles below the hysteretic temperature.

23. A method of heating a structure, comprising:
applying alternating current to a conductor having superparamagnetic particles embedded in a matrix located adjacent to the conductor, the superparamagnetic particles having a Curie temperature corresponding to a size of the superparamagnetic particles;
generating a magnetic field in response to the alternating current;
heating the superparamagnetic particles by relaxation heating in response to the magnetic field;
heating the structure conductively; and
reducing the relaxation heating of the superparamagnetic particles when the superparamagnetic particles attain the Curie temperature.

24. The method of claim 23 further comprising:
adjusting the Curie temperature by altering a frequency of the alternating current.

25. The method of claim 23 further comprising:
selecting a plurality of particle sizes of the superparamagnetic particles for generating heat within a corresponding plurality of Curie temperatures.

* * * * *